US011213978B2

(12) United States Patent
Stollery et al.

(10) Patent No.: US 11,213,978 B2
(45) Date of Patent: Jan. 4, 2022

(54) STRIPPING OF A DIP-MOULDED GLOVE FROM A FORMER

(71) Applicant: Safedon Limited, Woodbridge (GB)

(72) Inventors: Jonathan William Stollery, Suffolk (GB); Kim Marie Stollery, Suffolk (GB)

(73) Assignee: SAFEDON LIMITED, Bourne (GB)

( * ) Notice: Subject to any disclaimer, the term of this patent is extended or adjusted under 35 U.S.C. 154(b) by 899 days.

(21) Appl. No.: 15/554,507

(22) PCT Filed: Mar. 4, 2016

(86) PCT No.: PCT/IB2016/051245
§ 371 (c)(1),
(2) Date: Aug. 30, 2017

(87) PCT Pub. No.: WO2016/139640
PCT Pub. Date: Sep. 9, 2016

(65) Prior Publication Data
US 2018/0071961 A1    Mar. 15, 2018

(30) Foreign Application Priority Data

Mar. 4, 2015   (GB) ..................................... 1503672

(51) Int. Cl.
*B29C 41/42*   (2006.01)
*B29C 41/14*   (2006.01)
(Continued)

(52) U.S. Cl.
CPC ............... *B29C 41/42* (2013.01); *B25J 11/00* (2013.01); *B29C 37/0017* (2013.01);
(Continued)

(58) Field of Classification Search
None
See application file for complete search history.

(56) References Cited

U.S. PATENT DOCUMENTS 3,304,576 A * 2/1967 Keesling ............. B29C 37/0017
                                                425/274
3,369,271 A * 2/1968 Rodrigues ........... B29C 67/0018
                                                425/438
(Continued)

FOREIGN PATENT DOCUMENTS

AU          3213278       7/1979
CN         201105930      8/2008
(Continued)

OTHER PUBLICATIONS

International Search Report in PCT Application PCT/IB2016/051245, EPO, dated May 20, 2016.
(Continued)

*Primary Examiner* — Matthew J Daniels
*Assistant Examiner* — Mohammad M Ameen
(74) *Attorney, Agent, or Firm* — Bourque & Associates PA

(57) ABSTRACT

A glove stripping apparatus (15) for fully stripping a partially stripped elastomeric dip-moulded glove (2) from a hand-shaped dip-moulding former (4) comprises a gripping device (25) relatively movable with respect to a downwardly hanging cuff end portion (10), a gripping actuator (32), a stripping actuator (35) and a controller for controlling the operation of the actuators. The relative movement of the gripping device and the downwardly hanging cuff end portion is driven by the stripping actuator. The gripping device has first and second gripping members (24, 26) movable relative to each other by the gripping actuator. The gripping members provide opposed gripping surfaces (34, 36) for gripping the cuff end portion. The first gripping member and the second gripping member initially provide a horizontally extending gap between the gripping surfaces which receives the cuff end portion. The gripping members are moved to reduce the gap (40') until the cuff end portion
(Continued)

is restrained between the gripping surfaces with a beaded cuff end (3) of the glove being below the gap. The gripping members are moved downwardly (46) together towards the beaded cuff end so that the cuff end portion moves upwards relative to the gap until the beaded cuff end (3) is caught by the gap (40'). The downward movement is then continued until the glove is fully stripped from the dip-moulding former.

13 Claims, 16 Drawing Sheets

(51) Int. Cl.
*B25J 11/00* (2006.01)
*B29C 37/00* (2006.01)
B29L 31/48 (2006.01)
B29D 99/00 (2010.01)
B29K 21/00 (2006.01)

(52) U.S. Cl.
CPC .......... *B29C 41/14* (2013.01); *B29D 99/0067* (2013.01); *B29K 2021/00* (2013.01); *B29L 2031/4864* (2013.01)

(56) References Cited

U.S. PATENT DOCUMENTS

| | | | |
|---|---|---|---|
| 3,655,317 A * | 4/1972 | Funkhouser | B29C 37/0017 425/165 |
| 5,776,520 A | 7/1998 | Howe | |
| 5,909,800 A * | 6/1999 | Huang | B29C 41/42 198/803.4 |

FOREIGN PATENT DOCUMENTS

| | | | |
|---|---|---|---|
| CN | 201105930 Y | * | 8/2008 |
| CN | 202439169 | | 9/2012 |
| CN | 203888113 | | 10/2014 |
| DE | 2108486 | | 9/1971 |
| EP | 0561651 A1 | | 9/1993 |
| GB | 851853 | | 10/1960 |
| GB | 851863 A | * | 10/1960 |
| GB | 1334168 | | 10/1973 |
| GB | 1487738 A | | 10/1977 |
| GB | 1592888 | | 7/1981 |
| JP | 1977-00059 | | 1/1977 |
| JP | 56-067243 | | 6/1981 |
| KR | 100226173 | | 10/1999 |
| RU | 2017129448 | | 9/2019 |
| SU | 1694402 A1 | | 11/1991 |
| WO | WO 2010020782 | | 2/2010 |
| WO | WO 2011048414 | | 4/2011 |
| WO | WO2014122595 | | 8/2014 |
| WO | WO 2014122595 | | 8/2014 |
| WO | WO2018037243 | | 3/2018 |

OTHER PUBLICATIONS

Search Report in Application GB1503672.6 UK IPO, dated Sep. 4, 2015.
PCT-GB2017-05207 search report dated Nov. 17, 2017.
GB 1614568.2 search reports dated Feb. 15, 2017.
CN201105930 English translation.
JP1981-067243A English translation.
JP 2019-54237 Japanese Office Action English Translation dated Feb. 20, 2020.
New Zealand Application 734672 Examination Report dated Dec. 23, 2020 (note all 4 cited documents correspond to the present patent application filed in other countries).
India application 201717029325 Examination report dated Nov. 27, 2020.
Russia Patent Application 2017129448 Grant Decision.
English translation.
J English Translation Feb. 20, 2020.

* cited by examiner

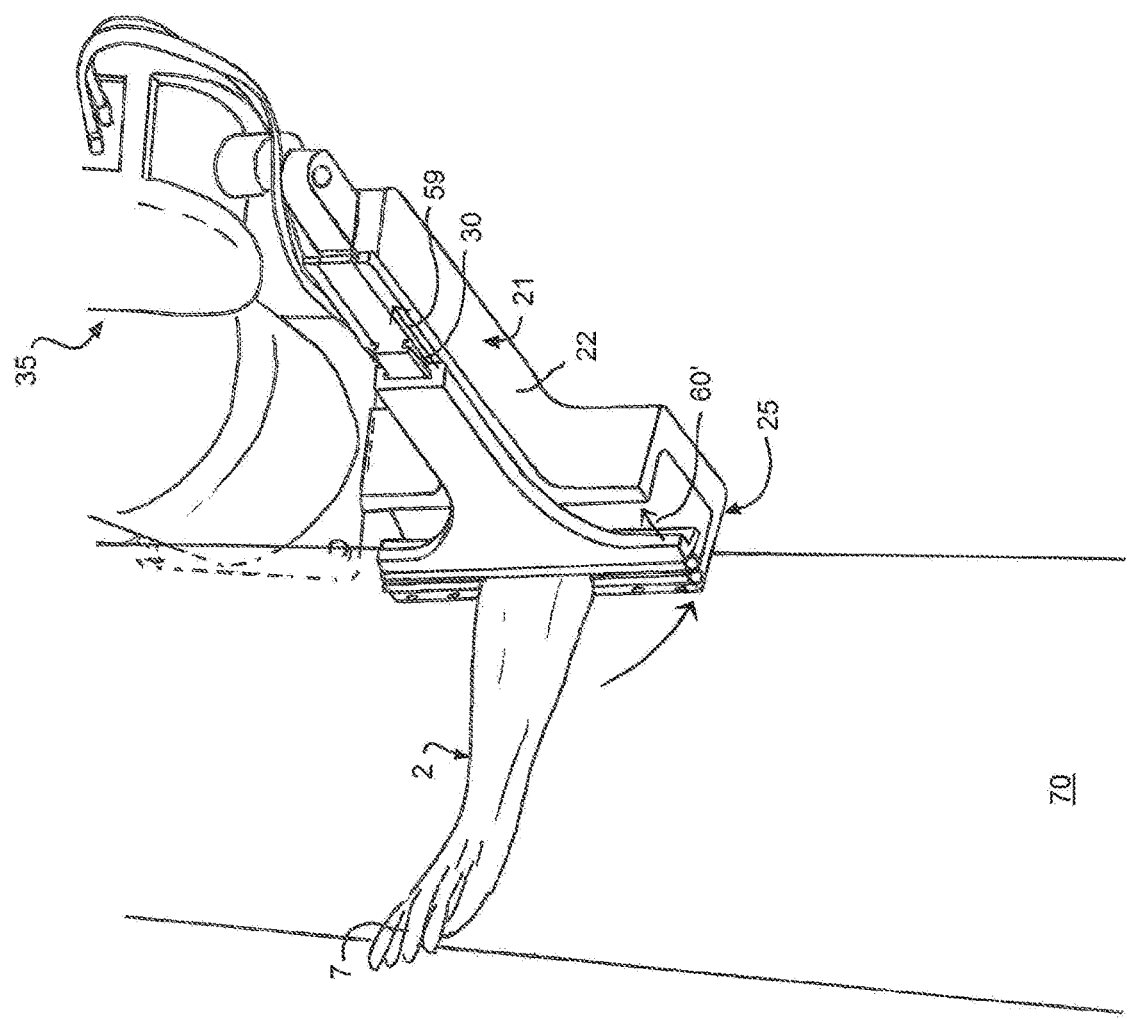
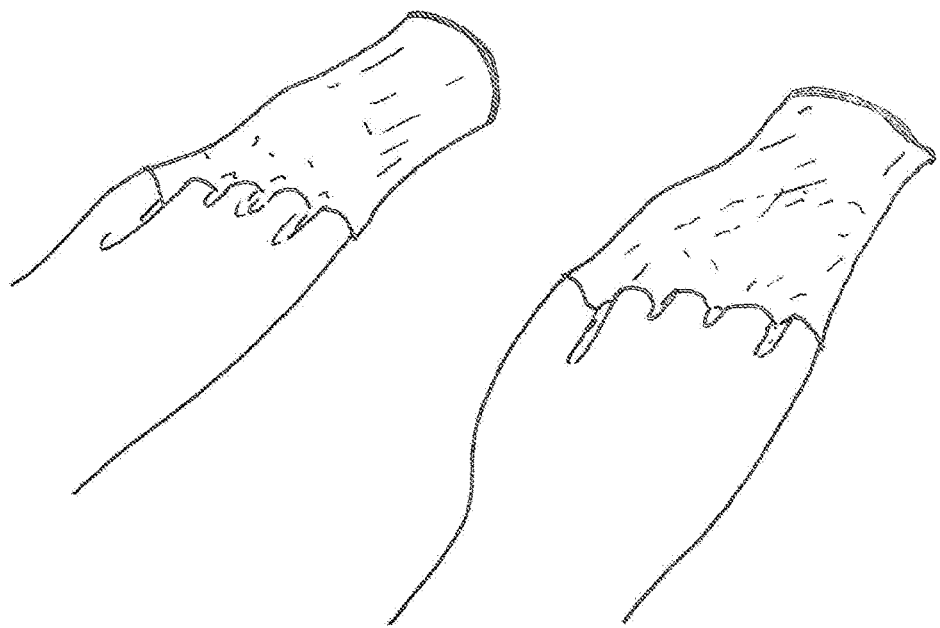
Fig. 11

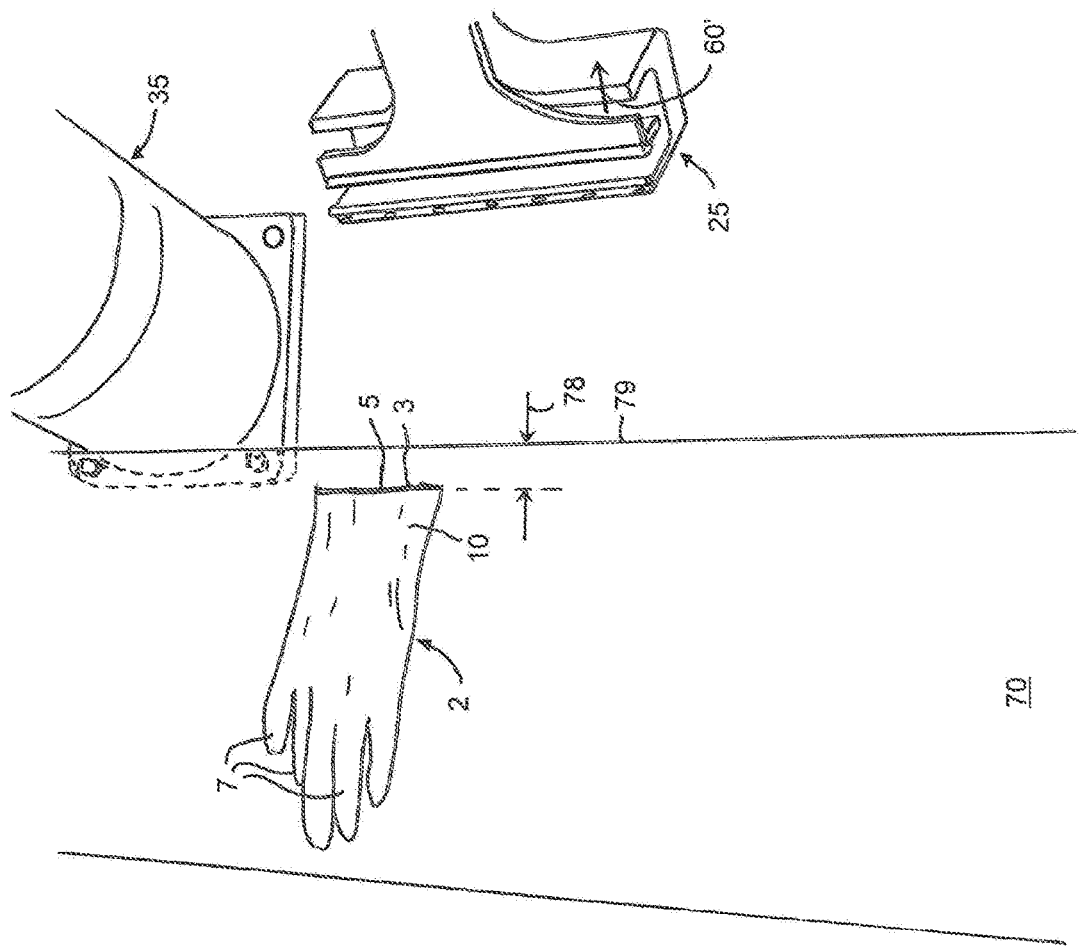
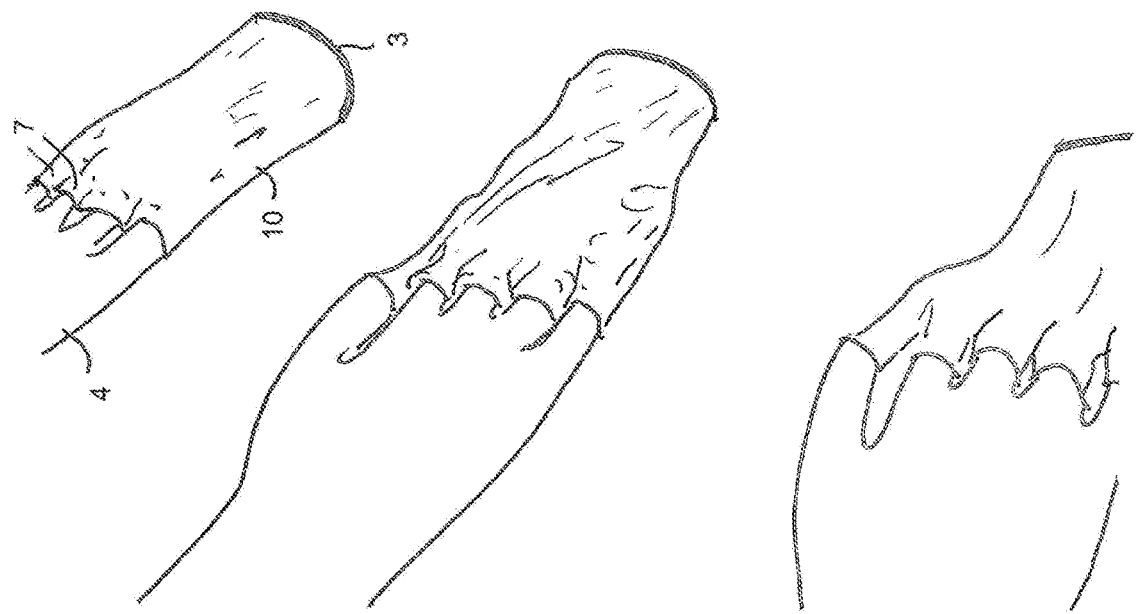
Fig. 12

STRIPPING OF A DIP-MOULDED GLOVE FROM A FORMER

BACKGROUND a. Field of the Invention

The present invention relates to an apparatus and method for the stripping of elastomeric gloves from a dip-moulding former, when the gloves have already been partially stripped such that each glove has a downwardly hanging cuff end portion with a terminal beaded cuff end. The invention particularly relates to the stripping and subsequent handling of dip-moulded disposable inspection gloves such as those used in clinical, veterinary, dental or medical environments or in other situations where hygiene is important, such as food preparation.

b. Related Art

There is an increasing need to control infection of patients in hospitals, clinics, and doctors' surgeries from infectious bacteria resistant to multiple antibiotics, in particular methicillin-resistant *Staphylococcus aureus* (MRSA). Research has also shown that if someone has MRSA on their hands, the bacteria would be left on the next four surfaces touched by that person. Once MRSA is on an item it will remain there for up to 80 days unless that item is cleaned. *C. difficile* will remain active on surfaces much longer than that. One effective and inexpensive way to control such contamination is the use of disposable inspection gloves.

Examples of manual and automatic production systems for packing such gloves into a box or dispenser are disclosed in patent documents WO 2010/020782 A2 and WO 2011/048414 A1. Such systems work most effectively when gloves are presented to a packing station in a predictable or regular manner by a conveyor.

In such production systems, whether for gloves or other products that are similarly flexible and relatively flat, it can be very useful to transport products on a conveyor, for example a belt conveyor.

Dip-moulded gloves are produced on a mould or tool, referred to herein as a "former", having a particular shape. The former is dipped into a liquid bath and then raised out of the bath and heated, dried or cured in order to remove solvent from the liquid clinging to the former or to cross-link polymer chains, and so leave a solid film on the former. In this description, the resulting film is referred to as having been "cured".

Disposable inspection gloves are increasingly made from nitrile butadiene rubber, referred to herein simply as nitrile, owing to its relatively low cost, good flexibility and elasticity and non-allergenic properties. Such gloves are formed on a former that is hand-shaped with a cuff portion and with a digit portion at the end, the digit portion being oriented lowermost when dipped into and raised from a tank of liquid. A production plant will have a long continuous chain conveyor which transports the formers through the various production steps, which will include a stripping step in which the cured glove is stripped off the former inside out. Following this, the empty former is checked for any residues and cleaned, which can include dipping in an acid bath.

A glove manufacturing line will normally have two pairs of such chain conveyors, making four parallel lines, passing through the same tanks, and stripping and inspection stages. Production speeds are of the order of about one glove per second per line.

Stripping gloves off formers normally involves manual labour, at least in part of the stripping process. The process can be partly automated by using a glove stripping machine that pulls most of the glove off the former, such that a palm portion and a cuff end of the glove hangs downwards from the parts of the glove still in contact with the former, including the former digit tips. The gloves are provided with a reinforcing bead or rim at a cuff end. When partly stripped from the former, the glove cuff end hangs downwardly from the former digits.

At typical glove dip-moulding production speeds, there is normally the need for two, three or four workers per line. The free-hanging glove cuffs are normally pulled by workers to peel the glove digits completely off the former, after which each glove is dropped in a box or placed on a growing pile at the glove stripping station.

The cost of labour is an increasing component of the total cost of production. Therefore, machines are known for stripping gloves fully from a former. However, the issue is not just the labour required at the stripping station, but also the labour needed to handle gloves after these are removed from the stripping station for packing into boxes or dispensers.

Utility Model document CN 202439169 U discloses a machine for automatically stripping gloves from a dip-moulding former and placing the stripped gloves, one at a time, on a receiving surface to form a stack of gloves. Gloves are partially stripped from the former prior to reaching the machine which has a pair of opposed rollers. The rollers grip a cuff end of the glove which is then peeled off the former cuff-first so that the peeled glove is inside out relative to the formed glove. A limitation of machines such as this is that the stack of gloves which is formed beneath the pair of rollers is very uneven. Although workers can be employed to tidy and align each stack of gloves produced by the machine, the gloves still do not lie evenly flat within the stack, which makes further processing and packing that much more difficult to implement. The unevenness also significantly limits the maximum number of gloves that can be packaged in a glove dispenser.

Patent document WO 2014/122595 A1 discloses another way of stripping partially stripped elastomeric gloves from a dip-moulding former using a pair of opposed belt conveyors in a V-configuration which can be pivoted together to grip a cuff end portion. The belts are then activated to pull the cuff end and fully strip the glove from the former. Following this, the opposed belts can be moved into position for discharging the glove onto a conveyor belt by again activating the belt conveyors. Whilst this system is effective in providing a mechanised process for stripping gloves and then depositing gloves on a conveyor belt, the apparatus is relatively complex and heavy, which makes it more difficult to achieve a cycle time fast enough to match the speed of the glove production line. Furthermore, the position of the deposited cuff ends on the conveyor belt will vary in dependence on variations in how far the cuff end portion hangs downwardly from the former. This in turn places more demands on automatic glove packing equipment used to pick gloves from the conveyor belt and to pack gloves into dispensing containers.

It is an object of the present invention to provide a more convenient apparatus and method for stripping elastomeric gloves off a former in a dip-moulding process.

SUMMARY OF THE INVENTION

According to a first aspect of the invention there is provided a glove stripping apparatus for fully stripping a partially stripped elastomeric dip-moulded glove from a former by gripping and pulling a downwardly hanging cuff end portion of said glove, said cuff end portion terminating at a beaded cuff end, the apparatus comprising a gripping device, a gripping actuator, a stripping actuator and a controller for controlling the operation of said actuators, wherein the gripping device comprises opposed first and second gripping members, said gripping members being relatively movable with respect to each other and providing opposed gripping surfaces on opposite sides of a gap where said gripping members are closest to one another, and the gripping device has beneath the gap an open space for receiving therein a glove cuff end portion hanging downwardly between said gripping surfaces from said former, and wherein the controller is configured sequentially to use said actuators to:

relatively move the first gripping member and the second gripping member to an open configuration in which said gap is widened so that, in use, said downwardly hanging cuff end portion is admitted between said gripping surfaces and hangs freely between said gripping surfaces downwardly into said open space;

relatively move the first gripping member and the second gripping member to a constricted configuration in which said gap is narrowed sufficiently to block from passage through said narrowed gap said beaded cuff end but not said cuff end portion;

move the first gripping member and the second gripping member downwardly together towards said beaded cuff end so that, in use, said cuff end portion in said open space moves upwards through said narrowed gap until said beaded cuff end is caught between said gripping surfaces by said narrowed gap; and continue to move the first gripping member and the second gripping member downwardly together with said beaded cuff end caught between said gripping surfaces, thereby pulling said cuff end portion downwards until said glove is fully stripped from said former.

The open space can be any convenient or practicable size or volume of open space and at a minimum need have a volume large enough just to accommodate the cuff end portion beneath the gap and a width sufficiently greater than the narrowed gap so that the cuff end portion is free to move in the open space without the beaded cuff end becoming trapped or caught in the open space.

When the gap is widened, the gap has a first width and when the gap is narrowed it has a second width. Preferably, the first width is at least 50 mm, and most preferably at least 100 mm so that a cuff end can be received in between the gripping members without interference from the gripping members Preferably the second width is no more than about 2 mm, and most preferably no more than about 0.75 mm.

Preferably, the gap between the opposed gripping surfaces having the first width extends in a substantially horizontal direction.

Preferably, the gripping surfaces when moved relatively together present a downwardly opening funnel for channeling the beaded cuff ends into the constricted gap.

In the context of the present invention, a dip-moulded glove will be partially stripped from the former if one or digits (fingers and/or thumb) of the dip-moulded glove are remaining, fully or partially, on the former, with the cuff end portion hanging freely downwards from the former, with an open end of the glove having a beaded cuff end and being lowermost.

Depending on the grade of glove, the material thickness of the cuff end portion will be between about 2 to 15 mils (50 µm to 375 µm). The beaded cuff end will normally be at least twice this thickness and is more commonly ten times this thickness. Many nitrile gloves are about 4.5 mil thickness (115 µm). The narrowed gap between the opposed surfaces will be sized to accommodate least double this thickness but be less than the thickness of twice the expected beaded cuff end thickness. For example, if the beaded cuff end has a thickness of 20 mil (500 µm), then the narrowed gap should be no more than about 40 mil (1 mm).

The cuff end portion is therefore restrained such that the cuff end portion can move relatively upwards as the narrowed gap moves downwards towards the beaded cuff end.

Therefore, in general, the cuff end portion adjacent the beaded cuff end will have a first material thickness and the beaded end will have a second material thickness, the first thickness being less than the second thickness. The first material thickness is therefore less than or approximately equal to the narrowed gap second width and the narrowed gap second width is also less than about double the second material thickness of the beaded end, so that the beaded cuff end is caught by the narrowed gap, at least where the beaded thickness is doubled where the left and right sides of the cuff end fold back on itself.

The opposed gripping surfaces are movable with respect to each other whereby a width of the gap is adjustable. The gripping surfaces are first moved apart to a first width sufficient for the cuff end portion to be received between the opposed surfaces. The width can then be adjusted by moving the first and second gripping members relative to each other such that the gap has a second width that is less than the first width. The second width permits passage of the end portion between the opposed surfaces but not the beaded end of the glove cuff.

The gripping actuator may be configured to move one gripping member towards the cuff end portion and the other gripping member. This movement is preferably in a substantially horizontal direction.

The controller may be configured to use the actuators after the glove has been fully stripped to release the stripped glove in a substantially horizontal orientation.

By substantially horizontal, what is meant is that the plane of the glove is less than 45° relative to a horizontal plane, so that the glove can be deposited flat on a glove depositing surface, for example a growing stack of gloves or an upwardly facing glove conveying surface, for example the upper surface of a belt conveyor.

One or both of the opposed gripping surfaces may be a ridge-like projection, for example a lip, towards the gap.

In one embodiment of the invention, the opposed gripping surfaces are non-rotatable surfaces. In this case, the restrained cuff end portion will slip between the opposed gripping surfaces until the beaded cuff end reaches the gap, which is set to be narrow enough to catch or trap the beaded cuff end and prevent this from passing through the gap.

Optionally, at least one of the opposed gripping surfaces is a rolling surface of a roller configured to roll upwards as the restrained cuff end portion moves upwards relative to the narrowed gap until the beaded cuff end is caught by the narrowed gap. In this case, the narrowed gap may, optionally, be narrower so that the cuff end portion is rolled between one or both of the opposed surfaces.

In a second preferred embodiment of the invention, the first gripping member is a rotatable first roller having a first roller surface, and the second gripping member is a rotatable second roller having a second roller surface. These roller surfaces are cooperatively arranged such that respective portions of these surfaces are opposed to each other to provide the gap.

The gripping actuator and the stripping actuator may then be configured, in use, under the control of the controller, sequentially to:
- position the first roller and the second roller to provide the gap between the opposed portions of the roller surfaces,
- move the first roller and the second roller relative to the cuff end portion until the cuff end portion is restrained between the opposed roller surfaces with the beaded cuff end being below the narrowed gap;
- move the first roller and the second roller downwardly together towards the beaded cuff end whilst the opposed roller surfaces both rotate upwards in the narrowed gap so that the restrained cuff end portion moves upwards relative to the narrowed gap until the beaded cuff end is caught by the narrowed gap; and
- continue to move the first roller and the second roller downwardly together with the beaded cuff end caught by the narrowed gap thereby pulling the cuff end portion downwards until the glove is fully stripped from the former.

The upwards rotation of the opposed roller surfaces in the gap is preferably driven by the pull of the restrained cuff end portion as the first and second rollers move downwards.

The apparatus may further comprise a supporting platform disposed adjacent the first roller and being positioned to provide a support for a portion of the stripped glove extending away from the cuff end portion restrained between the opposed portions of the roller surfaces.

The glove stripping apparatus may further comprise a rotational actuator, the rotation of the first roller and/or the second roller being driven by this rotational actuator.

The controller may be configured to control the rotation of the rotational actuator such that after the glove has been fully stripped, the rotational actuator drives the first roller and/or the second roller to eject the glove from between the first roller and second roller in a substantially horizontal orientation.

The process of being ejected between the opposed surfaces will tend to flatten the glove, which is useful in helping to reduce packaging volume.

The supporting surface can help prevent unwanted creases or folds from developing and being drawn in between the opposed surfaces during ejection of the glove.

The process of pulling the glove across the supporting surface helps to pull the glove flat, owing to drag between the glove and the underlying supporting surface. This is helpful in the case of elastomeric gloves, such as disposable ambidextrous hygienic gloves, as digit portions will be further from the end or cuff portion of the glove held by the rolling means. The digits will therefore tend to be pulled and straightened by drag from the supporting surface prior to reaching the opposed oppositely rotating surfaces as the glove is being ejected.

If the glove is accelerated sufficiently quickly when the rollers start to eject the glove, then the inertia of the glove will also tend to stretch the glove and thereby even out any creases or folds.

The platform may be any type of platform, and may have a solid continuous supporting surface, a mesh, a grid, or any other suitable supporting surface. The platform need not be level, and can be at an angle to horizontal as long as the glove does not slip down the platform and become bunched near the rollers where the glove is held prior to ejection from between the rollers.

Preferably, the platform is a planar platform, the plane of the platform being substantially in line with the gap. Because the platform is then in line with the gap, the glove moves in a substantially straight line as the glove is being pulled across the surface. This helps to keep the glove flat prior to the glove being ejected, and this in turn can help the glove lie flat on a receiving surface after ejection.

The controller may be configured to oppositely rotate the first roller and the second roller whereby the supported portion of the stripped glove is pulled across the supporting surface and between the roller surfaces. The glove may thus be ejected from between the opposed portions of the roller surfaces.

One or both of the actuators may be configured to move or position the first roller and the second roller with respect to each other such that the second roller is above the first roller prior to the ejection of the glove. This may be relative movement when the first roller and the second roller are relatively movable with respect to each other, or this may be a reorientation of the position of the rollers with respect to each other.

According to a second aspect of the invention, there is provided a production line for producing a plurality of elastomeric dip-moulded gloves, the production line comprising:
- a plurality of dip-moulding formers;
- a dip-moulding stage for coating and curing on said formers said gloves;
- a partial glove stripping apparatus configured to partially strip said cured gloves from said formers such that a cuff end portion of said gloves hangs downwardly from said dip-moulding formers with a beaded open end of said gloves being lowermost, said cuff end portion having a first material thickness and said beaded cuff end having a second material thickness, said first thickness being less than said second thickness; and
- a glove stripping apparatus configured to fully strip said partially stripped gloves from said formers; wherein
- the glove stripping apparatus comprises an actuator system for griping and stripping partially stripped gloves from the formers and a gripping device with opposed first and second gripping members, said gripping members providing opposed gripping surfaces on opposite sides of a gap where said gripping members are closest to one another, the actuator system being configured to move said gripping members with respect to each other to vary the width of said gap;
- and wherein the actuator system is configured to:
- relatively move apart said gripping surfaces to increase the width of said gap and to position said moved apart surfaces on opposite sides of a downwardly hanging cuff end portion with said beaded open end of said glove hanging in an open space below said gripping surfaces;
- relatively move together said gripping surfaces to restrain said cuff end portion between said gripping surfaces, said gap being sufficiently narrow to block upwards passage of the beaded cuff end through said gap while being sufficiently wide to allow upwards passage of cuff end portion;
- relatively move said gripping surfaces away from the former in order to catch said beaded cuff end between said surfaces as the cuff end portion moves upwardly through said gap; and with said beaded cuff end caught by said gap, continue to relatively move said gripping surfaces away from the former in order to fully strip said gloves from said former.

According to a third aspect of the invention, there is provided a production line for producing a plurality of elastomeric dip-moulded gloves, the production line comprising:
- a plurality of dip-moulding formers;
- a dip-moulding stage for coating and curing on said formers said gloves;
- a partial glove stripping apparatus configured to partially strip said glove from said formers such that a cuff end portion of said gloves hangs downwardly from said dip-moulding former with a beaded open end of said gloves being lowermost, said cuff end portion having a first material thickness and said beaded cuff end having a second material thickness, said first thickness being less than said second thickness; and
- a glove stripping apparatus configured to fully strip said partially stripped gloves from said formers; and
- a conveying apparatus for transporting said formers from the dip-moulding stage to said partial glove stripping apparatus and said glove stripping apparatus; wherein the glove stripping apparatus is according to the first aspect of the invention.

The production line may further comprise a conveying apparatus for transporting the formers from the dip-moulding stage to the glove stripping apparatus and a conveying surface for conveying stripped gloves away from the glove stripping apparatus gloves. The glove stripping apparatus may then be configured to repeatedly strip gloves from the formers and to deposit the stripped gloves on the conveyor.

According to a fourth aspect of the invention, there is provided a method for fully stripping gloves from dip-moulding formers using a glove stripping apparatus when said gloves have already been partially stripped, said partially stripped gloves each having a cuff end portion terminated with a beaded cuff end hanging downwardly from said former, the beaded cuff end being of thicker material than that of the cuff end portion, and the apparatus comprising a gripping device relatively movable with respect to said downwardly hanging cuff end portion, and the gripping device comprising at least two gripping members including a first gripping member and a second gripping member, said gripping members having opposed gripping surfaces and being movable relative to each other, the method comprising the steps of:
- positioning the first gripping member and the second gripping member to provide a gap between said opposed gripping surfaces;
- receiving in said gap between said opposed gripping surfaces said downwardly hanging cuff end portion;
- moving the first gripping member and the second gripping member relative to said cuff end portion to reduce said gap until said cuff end portion is restrained between said opposed gripping surfaces with said beaded cuff end being below said narrowed gap;
- moving the first gripping member and the second gripping member downwardly together towards said beaded cuff end so that said restrained cuff end portion moves upwards relative to said narrowed gap until said beaded cuff end approaches said narrowed gap, said gap being insufficiently wide to allow passage of the beaded cuff end through said narrowed gap; and
- continuing to move the first gripping member and the second gripping member downwardly together with said beaded cuff end prevented from passing through said narrowed gap, thereby pulling said cuff end portion downwards until said glove is fully stripped from said dip-moulding former.

Preferably the gap prior to receiving the cuff end portion extends in a substantially horizontal direction.

The method may comprise the step of moving one gripping member towards both the cuff end portion and the other gripping member as the gap is narrowed.

The method may also comprise after the glove has been fully stripped the steps of orienting the stripped glove towards a substantially horizontal orientation for subsequent deposition on a substantially horizontal surface, and moving the first gripping member and the second gripping member relative to each other to free the cuff end portion.

In one embodiment of the invention, the method comprises after the glove has been fully stripped the step of using the gripping members to hold the glove only at the cuff end portion nearest the beaded cuff end and at the same time to accelerate the glove in a substantially downwards direction and then in a substantially horizontally.

The effect of this is that the glove is flattened by its own inertia and/or by aerodynamic drag prior to release in a substantially horizontal orientation on a depositing surface.

One or both of the opposed gripping surfaces may be a ridge-like projection towards the gap. The method may then comprise moving the opposed gripping surfaces relatively towards one another until the gap is sufficiently narrow so as to prevent passage of the material of the beaded cuff end and also sufficiently wide such that material of the cuff end portion can slide freely between the opposed gripping surfaces as the first gripping member and the second gripping member are moved downwardly together towards the beaded cuff end.

At least one of the opposed gripping surfaces may be a rolling surface of a roller.

The method may then comprise:
- moving the opposed gripping surfaces relatively towards one another until the gap is sufficiently narrow so as to prevent passage of the material of the beaded cuff end and also sufficiently narrow such that material of the cuff end portion can be held between the opposed gripping surfaces; and
- moving the rolling surface to facilitate the downward movement of the first gripping member and the second gripping member towards the beaded cuff end.

According to a fifth aspect of the invention, there is provided a production line process for producing plurality of elastomeric dip-moulded gloves, each glove having a digit portion and a cuff end portion, said cuff end portion terminating at a beaded cuff end, the production line comprising a plurality of dip-moulding formers on a conveying apparatus, a dip-moulding stage, a partial glove stripping stage and a full glove stripping stage, the process comprising using the conveying apparatus to move the dip-moulding formers sequentially through:
- the dip-moulding stage in which a resin is coated and cured on said formers to form said gloves;
- the partial glove stripping stage in which said beaded cuff end is formed at a terminal end of the cuff end portion following which the cuff end portion is stripped from said former to hang downwardly from said former with the beaded cuff end of the glove being lowermost, said cuff end portion having a first material thickness and said beaded cuff end having a second material thickness, said first thickness being less than said second thickness, and the full glove stripping stage, in which the partially stripped glove is fully stripped from the former using the method for fully stripping gloves from dip-moulding formers according to the fourth aspect of the invention.

In the different embodiments of the invention, the beaded end is held in a defined location in the glove stripper, i.e. in a defined position relative to the first and second gripping members. This relative position is repeatable from one stripped glove to the next, regardless of the length of the end portion of the glove hanging from the former.

It is a particular advantage of the invention that this position can be the result of a natural process in which the beaded end is too large to pass readily through the gap and therefore stops or becomes lodged at the gap. The invention therefore avoids the need for more complicated equipment and ways to achieve this registration, for example using machine vision system of sensors to detect the location of the beaded end.

Because each glove is held in position with at a well-defined location on the glove, the beaded cuff end, the gloves can then more easily be deposited with a reduced variation in the position of each deposited glove along a longitudinal axis of the glove. This simplifies subsequent processing of the glove and packing into packs, for example for dispensing from box dispensers. Interfolding of gloves by machine for cuff-first dispensing is also simplified. Ultimately, because gloves are packed more uniformly, more gloves can be packed in a box dispenser.

The invention therefore automatically aligns the beaded end of the stripped glove with respect the first and second gripping members prior to the glove gripper delivering the glove to the next processing stage, with the result that the glove can be delivered to the next processing stage in a predetermined and well-defined physical orientation.

BRIEF DESCRIPTION OF THE DRAWINGS

The invention will now be described, by way of example only and with reference to the accompanying drawings, in which:

FIG. 11 is a perspective view following from FIG. 10, showing how the stripping actuator continues to move downwards and laterally away in a transverse direction from the dip-moulding former while pulling the glove from the beaded cuff end through the air towards a substantially horizontal orientation;

FIG. 12 is a perspective view following from FIG. 11, showing how the gripping actuator is moved towards an open configuration to deposit the glove flat on a moving conveyor;

DETAILED DESCRIPTION

Figure 1:
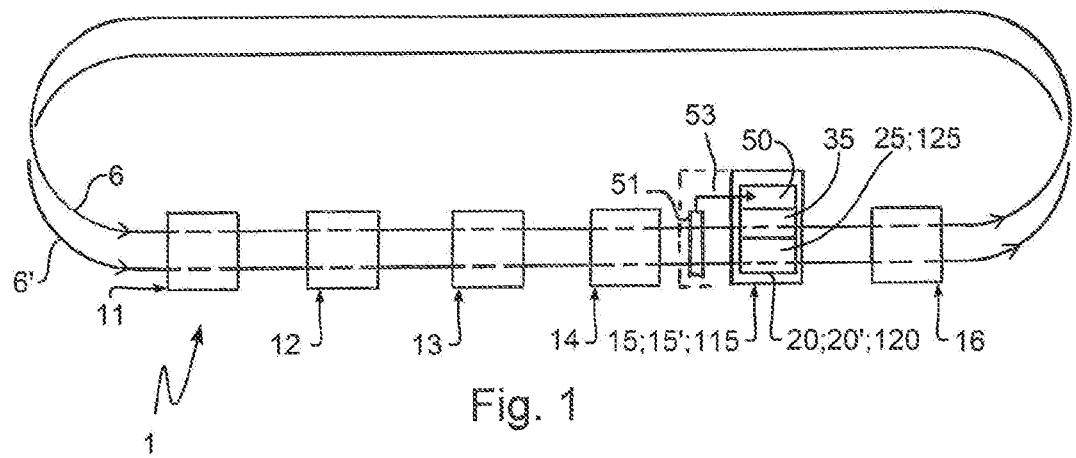
FIG. 1 is a schematic diagram of a production line according to preferred embodiments of the invention, for producing a plurality of hollow elastomeric gloves, which in this example are disposable nitrile gloves, the production line having a pair of tracks which pass through a series of process stages.
Figure 2:
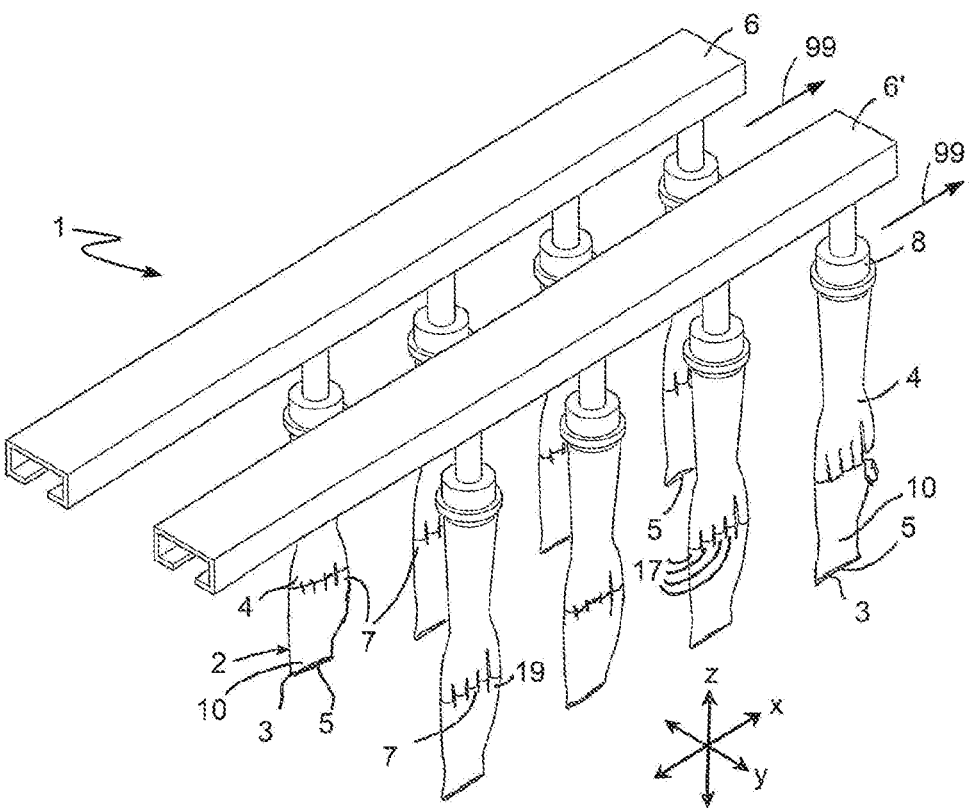
FIG. 2 is a perspective view of a segment of the production line of FIG. 1, showing how each track has a plurality of downwardly hanging hand-shaped formers on each of which has been dip-coated a glove, each glove having been cured and partially stripped so that a glove cuff end portion hangs downwardly with a beaded cuff end being lowermost.

FIG. 1 shows a schematic diagram of a production line 1 and FIG. 2 shows a perspective view of a segment of the production line for use in various embodiments of the invention described in detail below. The production line has a conveying apparatus, which in this example is a pair of track conveyors 6, 6' which convey a series of downwardly hanging dip-moulding formers 4 on which gloves 2 have been dip-moulded and subsequently cured. In this example, the formers are spaced apart on 200 mm centres.

The gloves are made from an elastomeric material, and in this example are disposable nitrile inspection gloves for use in medical, dental, veterinary or food preparation applications, however, the principles of the invention are applicable to other types of dip-moulded gloves of a similar thin, flexible and elastomeric material and having a beaded end. The gloves are formed on dip-moulding formers 4 using production processes which will be familiar to those skilled in the art. In this example, there are two parallel tracks 6, 6' each of which carries a chain (not shown) from which hangs a regularly spaced series of mounts 8, one for each former. Each line of formers 4 moves at a steady forward speed 99.

The movement of the formers 4 along the tracks defines a horizontal longitudinal direction and at right angles to this a horizontal transverse direction. In FIG. 2 these directions are labelled as, respectively, x-axis and y-axis, with the vertical direction being labelled as z-axis.

The formers 4 pass through a number of previous process stages prior to reaching the glove stripping apparatus of the invention, and these previous process stages are all well known in the art. The main stages include a dip clean stage 11 in which formers are dipped in an acid bath so that the formers are cleaned of all residues. The cleaned formers then pass to a dip-coating stage 12, followed by a curing stage 13 to form a glove 2 on each former 4. Together, the cleaning, dip-coating and curing states can be said to provide a dip-moulding stage.

Following the dip-moulding stage, the gloves cuff ends are rolled back in a first part of a partial glove stripping stage 14 to provide a beaded end 3 at a terminal end opening 5 of each glove. Because the beaded end is formed of a rolled up portion of glove material, the beaded end is thicker than an adjacent cuff portion 10 of the glove. The bead provides mechanical strength to the cuff terminal end 5 in use, but is also helpful when the glove is then to be partially stripped from the former.

As shown in FIG. 2, each glove 2 has already been partially stripped from its former 4 in the partial glove stripping stage 14 of FIG. 1. One known way of doing this, not shown in the drawings, is to introduce a blade under an end portion of the glove, which is here the cuff portion 10 of the glove, and then to blow or pull, the edge of the cuff towards a digit portion 7 of the glove. This tends to retract and fold the glove back on itself. Using known techniques, it is possible to do this in a production environment such that some, or preferably the entire digit portion 7 of the glove remains attached to the former 4, and so that the glove beaded end 3 and adjacent cuff portion 10 hang freely downward under the weight of these detached glove portions.

The digit portion 7 of the glove consists of four glove fingers 17 and one glove thumb 19. Preferably, these portions are symmetrical between opposite front 9 and back 9' glove sides (see FIGS. 6 and 7), so that each glove is ambidextrous, that is, equally suitable for donning on either the left hand or right hand of a user.

The partial glove stripping station or stage 14 is then followed by a full glove stripping station or stage 15, 15' 115, which is the subject of the various embodiments of the invention described in detail below.

In known production systems, this stage is often a manual process where workers manually pull and strip the gloves from the formers. Alternatively, it is known to use a pair of oppositely rotating rollers or belts having a pair of opposed rolling surfaces which firmly grip therebetween the glove end portion 10 and pull the glove fully from the former and eject the glove in a downwards direction. The ejected glove then falls, for example, on a roughly formed growing pile of gloves directly beneath each pair of rollers, such as described in CN 202439169 U or onto a moving belt conveyor as described in WO 2014/122595 A1. Such known production systems grip the downwardly hanging cuff portion wherever this happens to be, in the vertical z-axis direction, with a consequent variation in the location or timing of eventual ejection of the glove from the rotating rollers or belts.

As can be seen from FIG. 2, a feature of known partial glove stripping apparatuses is that the amount of the glove cuff or end portion 10 hanging downwardly from the former 4 varies from former to former. Although not shown, it is possible that some gloves may not be successfully partially stripped from the former such that the glove is not fully stripped by the subsequent full stripping stage 15. Therefore, it is usually the case that there is a need for a final manual process stage 16 in which a worker can pull off any gloves still on the formers.

Another consequence of the unevenness of partial stripping is that it is difficult in known full stripping processes to ensure a regular placement of the fully stripped glove in the location where the glove is deposited, for example a static, growing pile of gloves or a moving conveyor belt.

Figure 3:
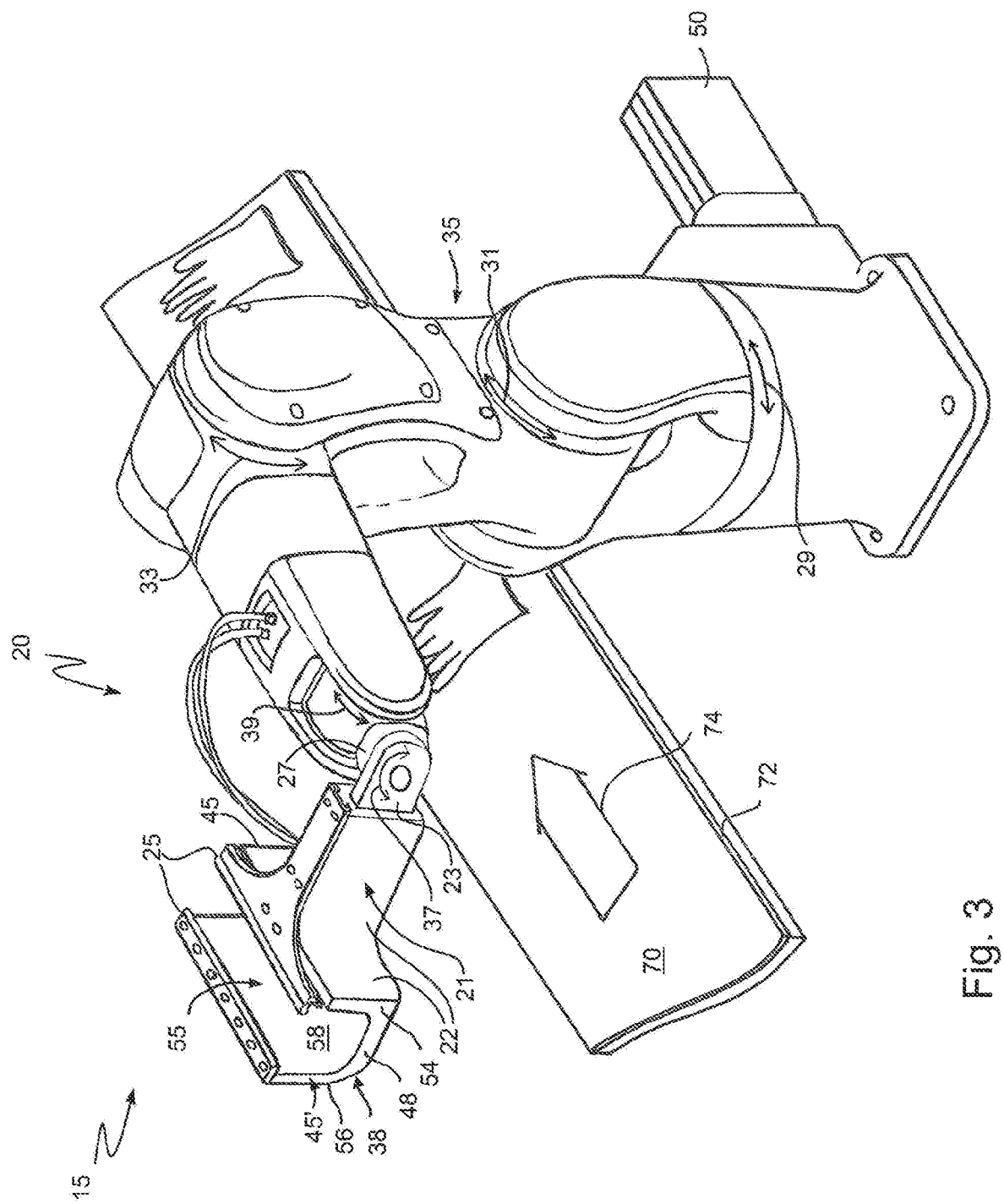
FIG. 3 is a perspective view of part of a glove stripping apparatus in a first preferred embodiment of the invention, having one gripping device for fully stripping a partially stripped elastomeric dip-moulded glove from the hand-shaped dip-moulding former of FIG. 2.
Figure 4:
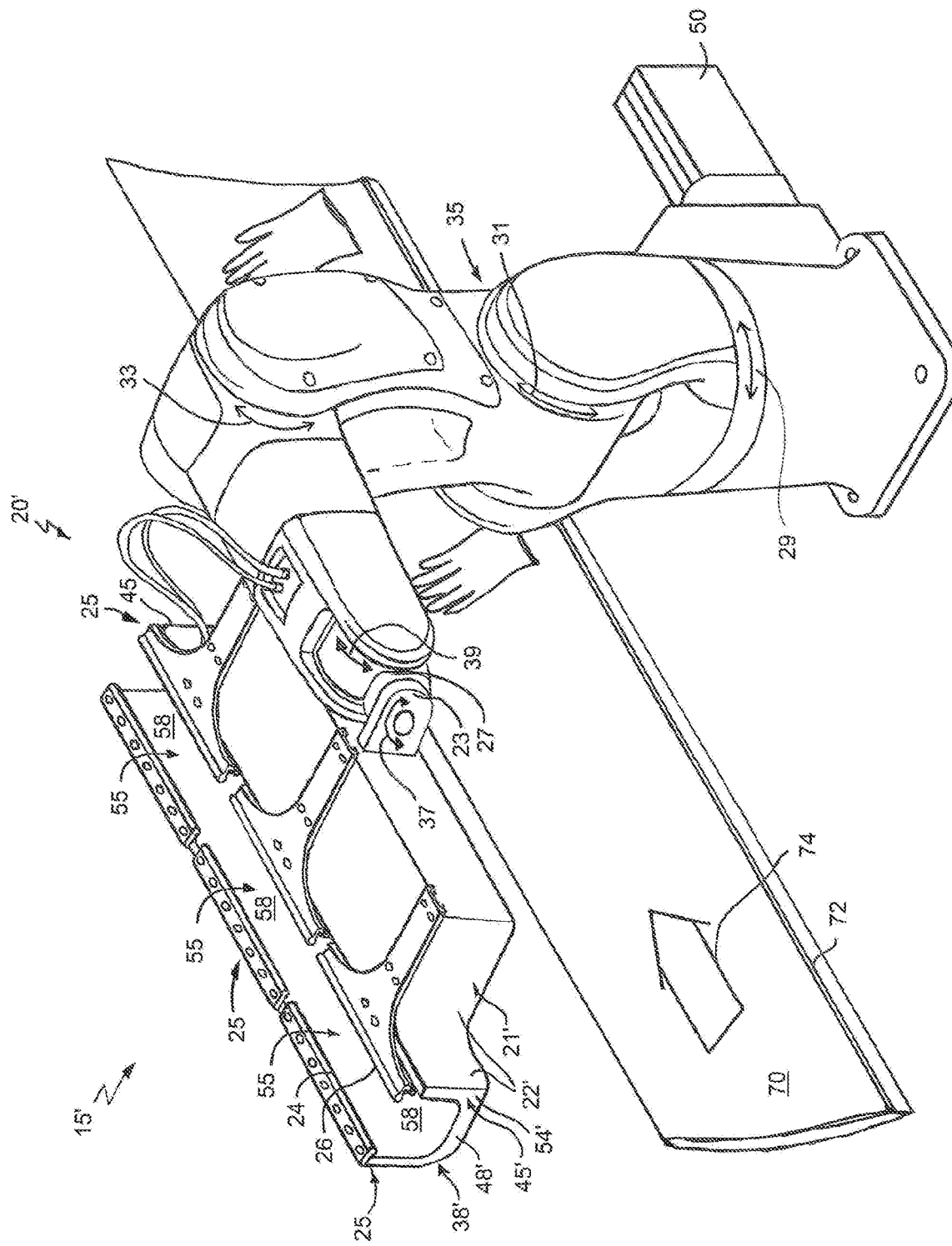
FIG. 4 is a perspective view of a variation of the glove stripping apparatus in the first embodiment of the invention, having three of the gripping devices.

FIGS. 3 and 4 show two variants of a first embodiment of the invention in which a full glove stripping station or stage 15, 15' has a glove stripping apparatus 20, 20' with, respectively, one or three gripping devices 25 for fully stripping a partially stripped gloves 2 from the dip-moulding formers. The construction of the gripping device 25 and operation of the first variant of glove stripping station is shown in more detail in FIGS. 5 to 12. As will be explain below, each gripping device comprises a glove gripping actuator.

Figure 13:
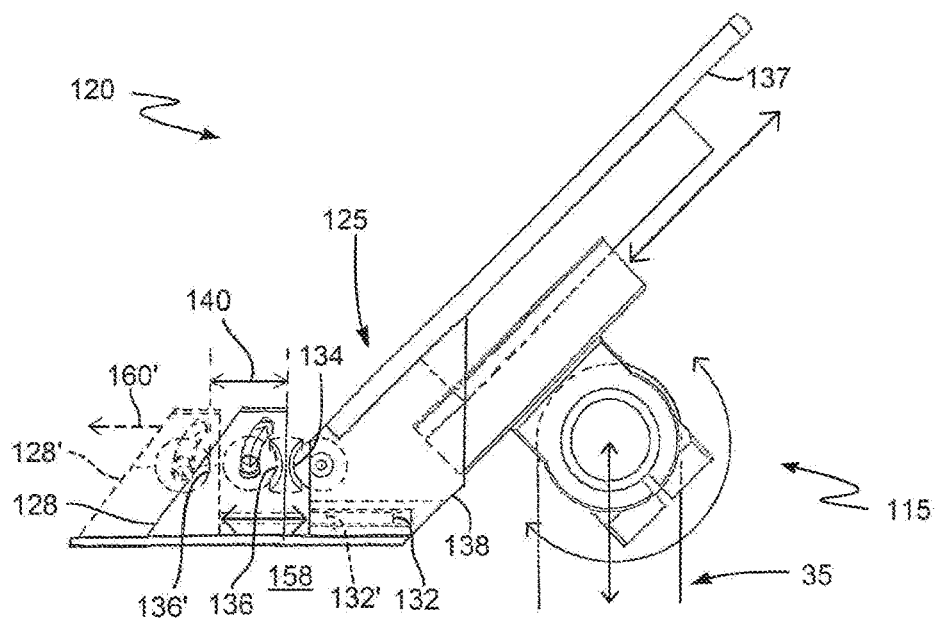
FIG. 13 is a side view of part of a second embodiment of stripping apparatus for fully stripping the partially stripped gloves from the formers.
Figure 14:
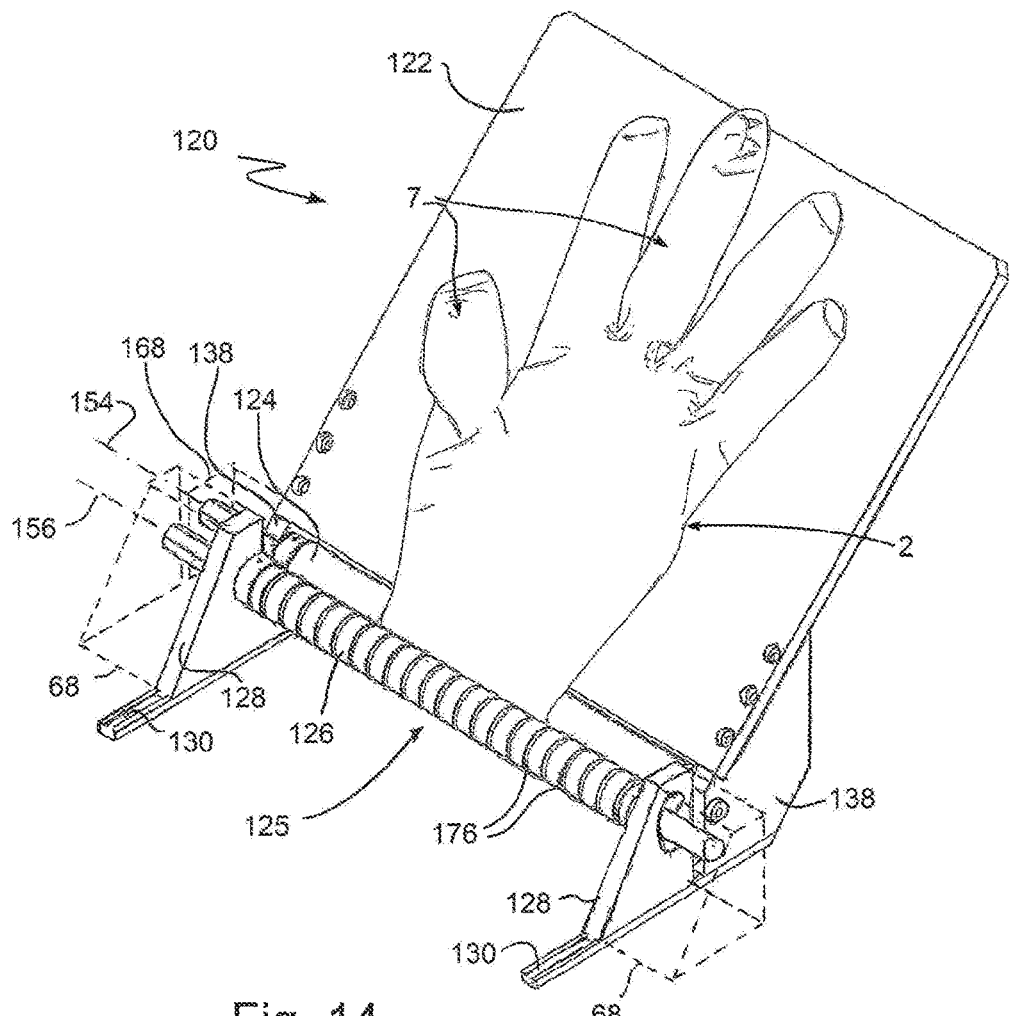
FIG. 14 is a perspective view showing how the glove, once fully stripped by the stripping apparatus of FIG. 13, falls to be supported by a supporting surface extending laterally away from a pair of opposed rollers.

FIGS. 13 and 14 show another form of gripping device 125 in a second embodiment of the invention, the operation of which as part of a full glove stripping station or stage 115 is shown in more detail in FIGS. 15 to 19.

Both embodiments include a robotic arm 35, which provides a glove stripping actuator, and an associated controller 50 for synchronised control of the movement of both the robotic arm and gripping device 25, 125.

There are limits to the speed of movement of the robotic arm and gripping device 25, 125, and therefore, for the sake of efficiency, each robotic and associated gripping device 25, 125 is preferably configured to strip gloves 2 from just one of the two dip-moulding production line tracks 6, 6', rather than from both. Furthermore, there may be more than one robotic arm and associated gripping device for each production line track. For example, the robotic arm 35 with one gripping device 25, 125 is capable of stripping and depositing one glove every 1.8 s. Current production lines for dip-moulded gloves typically produce up to about 10,000 gloves per hour per track, which equates to the dip-moulding formers moving along each track 6, 6' at a speed of one glove every 0.36 s. With a glove spacing centre-to-centre of 200 mm, the typical track speed is up to about 1.8 m/s. Therefore, at this line speed, a robotic arm 35 having a cycle time of 1.8 s and having a single gripping device is only capable of stripping every fifth glove, and so in practice there would be five separate robotic arms and associated gripping devices for each track 6, 6' at each full stripping station 15, 115. It is, of course, possible to reduce the cycle time with the use of lighter-weight materials or more powerful motors driving the stripping actuator. However, a single gripping device will be less expensive than a single robotic arm, and so it is preferred if more than one gripping device 25, 125 is joined together, for example as in shown in FIG. 3. The number of robotic arms needed at the glove stripping station can be decreased. For ease of illustration only, the following description relates to the use of just a single gripping device. The skilled person will appreciate that the principles of the invention are equally applicable when one robotic arm is joined to multiple gripping devices.

Each gripping device 25, 125 is connected at a manipulating end 27 of the robotic arm 35. The robotic arm has a several pivoting joints 29, 31, 33, 37, 39 and internal motors (not shown), which may be either electric or hydraulic, that give the manipulating end 27 of the arm freedom of movement in three orthogonal linear axes (x, y, z) relative to the direction of the dip-moulding production line tracks 6, 6' (see FIG. 2), as well as rotational freedom about the x-axis, which is defined by the direction of movement of the formers 4 along the production line tracks 6, 6', and also rotational freedom about the z-axis. The construction of this type of robotic arm is, in itself, conventional and well-known to those skilled in the art of robotic actuators, and so will not be further described in detail.

The pivoting joints and motors of the robotic arm 35 provide a glove stripping actuator for the glove stripping apparatus 20, 20', 120.

In both embodiments, the stripped glove is deposited onto a receiving surface 70, which is preferably a belt conveying surface of a belt conveyor 72 moving forwards 74 in the longitudinal direction at the same speed as the glove formers 4. The glove receiving surface may, however, be essentially non-moving, in which case a stack of gloves will be built up on the receiving surface, which may then be periodically removed. The receiving surface may also be an inside surface of a box in which the gloves are deposited.

In the first embodiment 15, 15', the robotic arm 35 is on the right hand side of the receiving surface 70 of the belt conveyor 72 relative to its direction of movement 74. The line of formers 4 is on the opposite side. In the second embodiment, the robotic arm is on the left hand side of the receiving surface of the belt conveyor, and the same side as the line of formers 4. Apart from these differences, and the actual mounting of the gripping device 25, 125 at the robotic arm end 27, the robotic arm is the same in both embodiments.

Figure 5:
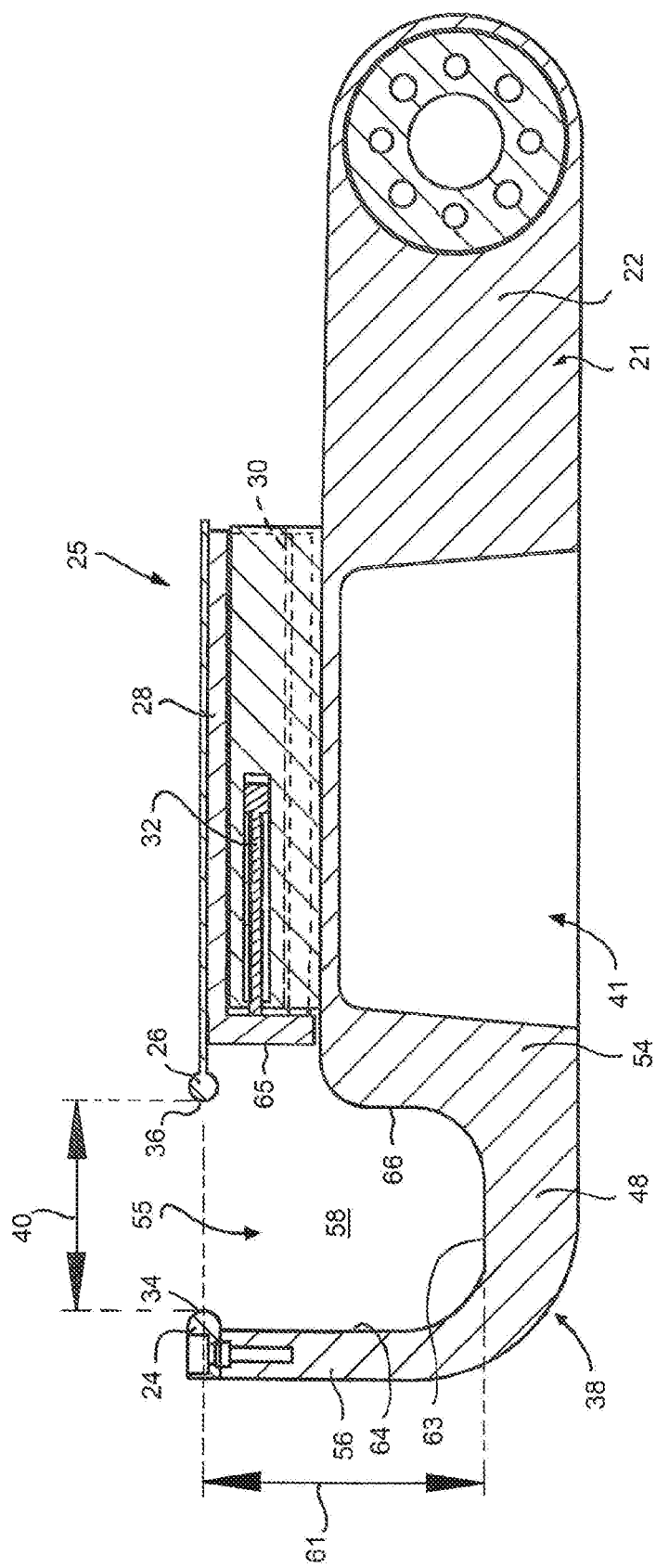
FIG. 5 is a cross-section view of the gripping device, showing how this has two gripping members having corresponding gripping surfaces separated by a gap.

The gripping device 25 of the first embodiment will now be described in detail with reference to FIGS. 5 to 7 which show the construction and operation of the gripping device along a vertically extending central plane through the gripping device. Each gripping device 25 includes a supporting arm 21, 21' an end 23 of which is connected to an end 27 of the robotic arm so that the gripping device 25 is relatively movable with respect to the downwardly hanging cuff end portion 10. The mass of the supporting arm should be minimised to help decrease the cycle time of the apparatus. Therefore, the supporting arm may include one or more cut-outs 41 and may be made from a light-weight and rigid material, such as a carbon-fibre composite material.

The gripping device 25 comprises a gripping actuator 32 which in this example is a pneumatically driven linearly acting piston, the actuation of which is controlled by the controller 50. The gripping actuator 32, robotic arm 35 and controller 50 together provide an actuator system for gripping and stripping partially stripped gloves 2 from the formers 4.

The gripping device 25 has, in this example two gripping members, namely a first gripping member 24, and a second gripping member 26 which are movable relative to each other in the transverse direction. Each gripping member 24, 26 extends substantially horizontally in the longitudinal direction and each is preferably at substantially the same level as the other. The gripping members are also preferably straight and parallel with respect to each other and also preferably substantially parallel with the longitudinal direction of movement along the x-axis of the formers 4 along the production line tracks 6, 6'. The gripping members are thus separated in the transverse y-axis direction by a clear gap 40 where the separation between said first and second gripping members is at a minimum. In this example, the gap is a slot between the two gripping members. Each gripping member 24, 26 provides a corresponding gripping surface 34, 36 that is inwardly directed across the gap 40 towards the other gripping surface. When the gripping members are moved to an open configuration in which these members are relatively far apart, the gap has a first width and when the gripping members are moved to a narrowed or constricted configuration in which these members are relatively closer together, the gap has a second width. The second width is therefore less than the first width.

Beneath the gap is an open space or void 58. The open space extends beneath the gripping surfaces along the full longitudinal length of the gap 40. The gap therefore presents an upwardly facing opening for receiving between the gripping surfaces 34, 36 and within the open space 58 the downwardly hanging cuff end portion 10. In this example, there are just two gripping members, each of which extends continuously on either side of the gap 40. It would, however, be possible to provide a greater number of gripping members, for example several separate gripping members spaced apart in the longitudinal direction.

The gripping members 24, 26 are relatively movable with respect to each other so that the gap 40 may be either narrowed or opened up. In this example, the first gripping member is fixedly mounted to the arm 21, 21' and the second gripping member 26 is slidably mounted to the arm being affixed to a linearly movable carriage 28 which slides on a track 30 affixed to the supporting arm.

The gap 40 extends longitudinally to a side 45' of the gripping device or member which faces towards the on-coming cuff ends 10. The advantage of having a gap which is open both upwardly and to the upstream side of the former production line 6, 6' is that this facilitates entry of the cuff end into the gap. The opposite right hand side 45 of the gripping device is also open, so that the gripping device can, if needed, alternatively be used in a mirror image orientation of the dip-former production line 6, 6'.

The gripping members 24, 26 are convex in a transverse plane extending above and below the gap. In this example, these gripping members are rounded, lip-like or ridge-like protrusions or projections, preferably part-cylindrical, that extend parallel to one another in the longitudinal direction. Preferably, the gripping surface of at least one gripping member overhangs the open space or a void 58 beneath the gap when the gap is in the open configuration. The corresponding gripping surfaces 34, 36 when moved relatively closer present a downwardly oriented funnel which leads to a constriction at the narrowest part of the gap.

The arm 21, 21' has an elongate main body portion 22, 22' extending away from the end 27 of the robotic arm 35 and terminates in an L-shaped projection 38, 38' that has a first, proximal portion 48, 48' that extends from a lower portion 54, 54' of the arm main body 22, 22' and a second, distal portion 56, 56' that extends perpendicularly upwards from the first portion. The fixed gripping member 24 is mounted at the top of the distal portion 56, 56' of the projection 38, 38', and the movable gripping member is slidably mounted above the main body portion 22, 22'. The arm main body 22, 22' and the L-shaped projection 38, 38' have in cross-section a generally U-shaped cross-section, the interior of which therefore provides beneath the gap of each gripping device 25 open space 58 for receiving therein the downwardly hanging glove cuff end portion 10. In this example, the open space 58 is therefore provided by a recess 55 in an end portion 38, 54 of the arm 21, 21', this recess being substantially U-shaped in form in a transversely extending vertical plane, and facing upwards towards the gripping members.

When the gripping members move relative to each other into a constricted configuration, the gripping actuator 32 moves the innermost gripping member 26 in a transverse direction towards 60 or away 60' from the fixed gripping member 24.

The recess 55 preferably has a vertical extent or depth 61 sufficient so that the lowest expected hanging cuff end 10 does not drag on a base or floor surface 63 of the recess. In this example the maximum width of the gap is between about 50 mm and 125 mm and the depth of the open space is between 75 mm and 150 mm. The fixed gripping member protrusion 24 overhangs a corresponding front side wall or outer side wall 64, preferably by between about 5 mm and 10 mm, which provides on one side of the cuff end 10 a minimum amount of the open space to ensure that the cuff end 10 held between the gripping members 24, 26 continues to hang downwardly freely when the gap 40 is narrowed. The beaded cuff end 3 is therefore free to move within the open space 58.

The movable gripping member protrusion 26 similarly overhangs a rear side wall or inner side wall 65 which is part of the slider 28 and therefore moves with the movable gripping member 26. Once the lateral size of the gap 40' is narrowed, the movable gripping member protrusion 26 and attached inner side wall 65 both overhang a corresponding lower inner side wall 66 of the recess 55. These features also provide space for the cuff end 10 held loosely between the gripping members 24, 26 when the gap 40' is narrowed.

With reference now to FIGS. 8 to 12, which show how a glove 2 is stripped from the dip-moulding former 4 and deposited on the depositing surface 70, the actuation of the robotic arm 35 and the movement of the gripping actuator 32 are synchronised by the controller 50 in accordance with the position of the moving former and the glove end portion hanging down from the former. Therefore, as shown schematically in FIG. 1, in both the first and second embodiments, the controller 50 may optionally be connected to a sensor 51 on the dip-moulding production line 6, 6' which provides a signal 53 to the controller regarding the position of the moving formers 4 relative to robotic arm and gripping device of the stripping station 15, 15' 115. Another way to synchronise the robotic arm 35 and gripping actuator 32 with the position of the gloves 2 on the dip-moulding formers, not illustrated, would be to use a machine vision system to gauge the position of each downwardly hanging cuff end 10, and then to provide an output from this system to the controller.

Figure 6:
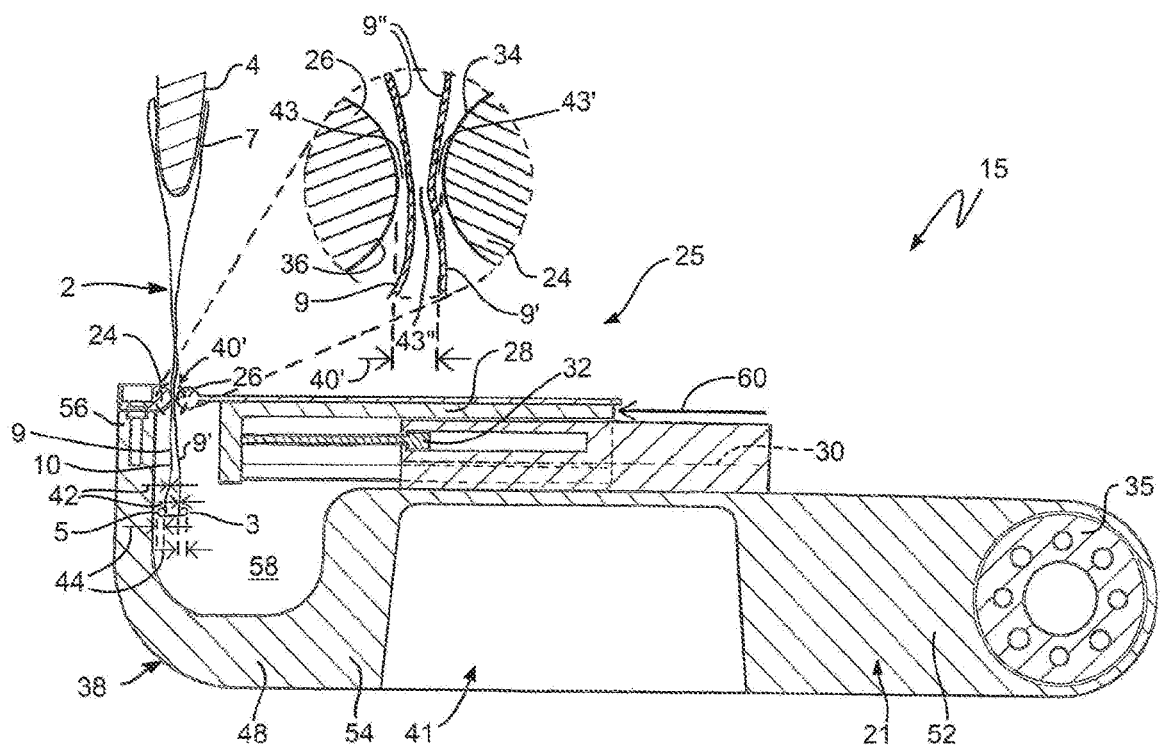
FIG. 6 shows how one of the gripping members is moved by a gripping actuator towards the other of the gripping members when a cuff end portion hanging downwardly from the dip-moulding former is between the gripping members, the cuff end portion thereby being loosely restrained, but not held or gripped, between the gripping surfaces.
Figure 8:
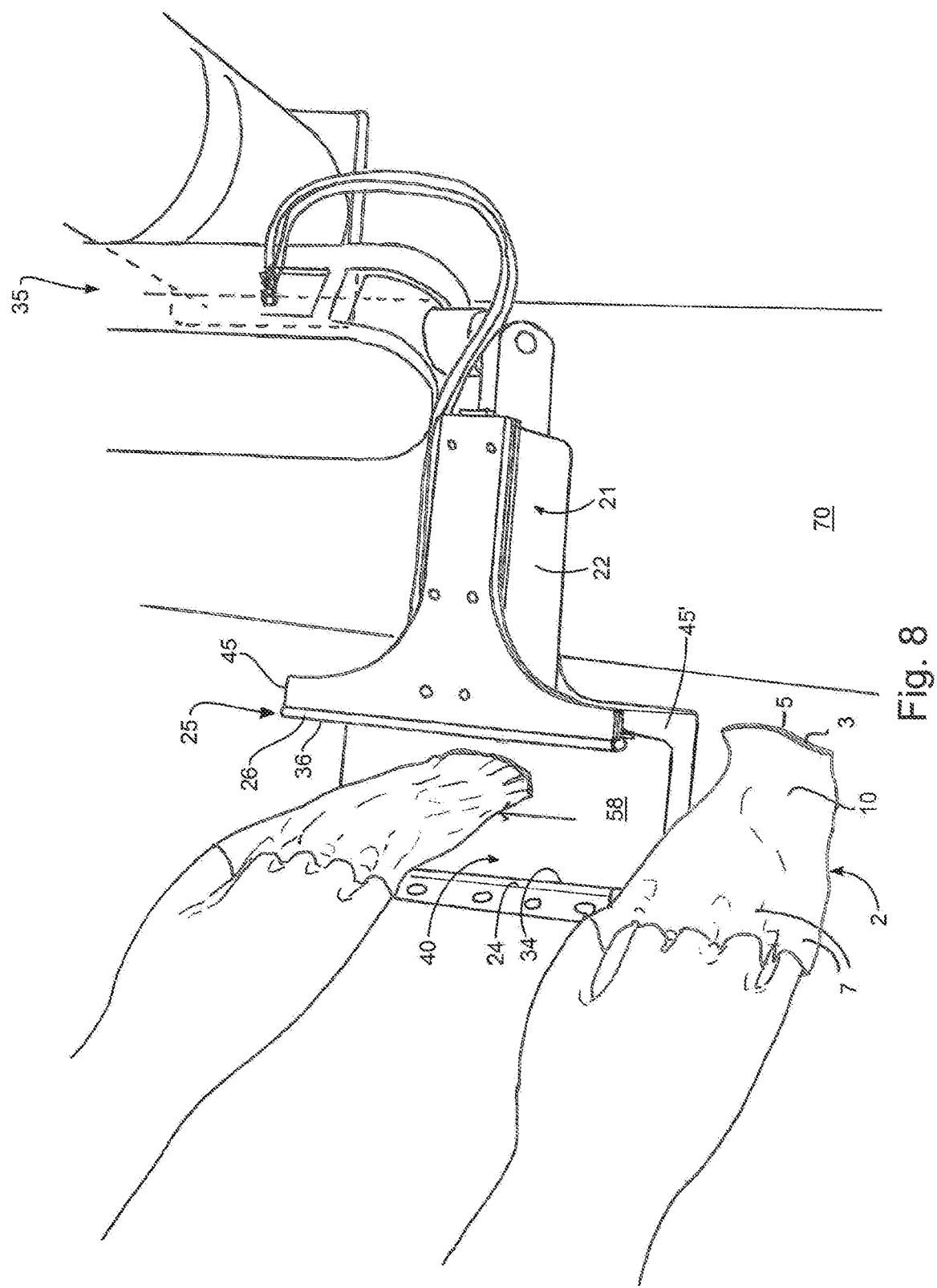
FIG. 8 is a perspective view of a full glove stripping station that includes the glove stripping apparatus of FIG. 3, with a downwardly hanging glove cuff end being conveyed in a longitudinal direction by its former in between the gripping members in an open configuration.
Figure 9:
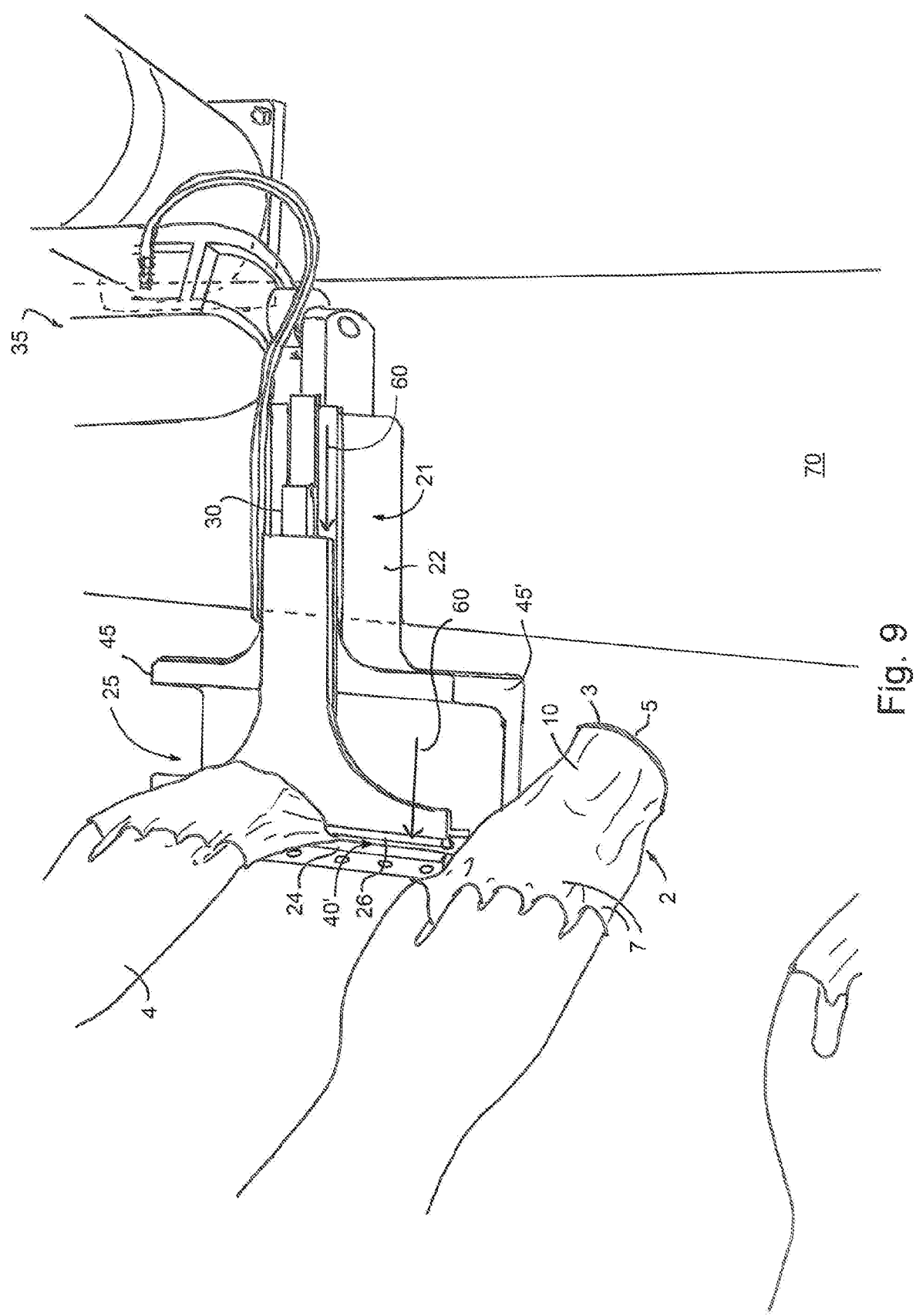
FIG. 9 is a perspective view following from FIG. 8, showing how the gripping members are transversely moved towards a constricted configuration with a clear gap separating the opposed gripping surfaces, the clear gap being more than the total material thickness of the cuff end portion so that this is only loosely restrained.

As shown in FIGS. 6, 8 and 9, after the robotic arm 35 moves the gripping device into position to receive a glove cuff end portion 10, and once received between the gripping members 24, 26, the gripping actuator 32 moves the second gripping member towards 60 the first gripping member to reduce the size of the gap 40' to a second width less than the first width such that the constricted gap is just wide enough for the cuff end portion to move freely through the gap without any binding or any hindrance from the opposed gripping surfaces 34, 36. In general, in both embodiments of the invention as shown in the enlarged inset views of FIGS. 6 and 15, which illustrate the narrowed gap 40', 140', one or more clearance gaps will remain in the three interfaces between the opposed gripping members 24, 26, 124, 126 where the gripping surfaces of the restricted gap are closest together, these interfaces being: the two interfaces 43, 43' between the glove opposite external surfaces 9, 9' and the opposed gripping surfaces 34, 36, 134, 136, and the interface 43" between the glove internal surfaces 9" inside the hollow cuff end portion.

It would, however, be possible for there to be some contact and some resulting friction between the glove end portion and the gripping surfaces in the constricted gap, particularly if both gripping surfaces were on rollers free to rotate in response to such friction. In all cases, the cuff end portion is then restrained, but free to move at least in an upwards direction, between the opposed gripping surfaces 34, 36, 134, 136 with the beaded cuff end 3 being below the narrowed or constricted gap 40', 140'.

Figure 7:
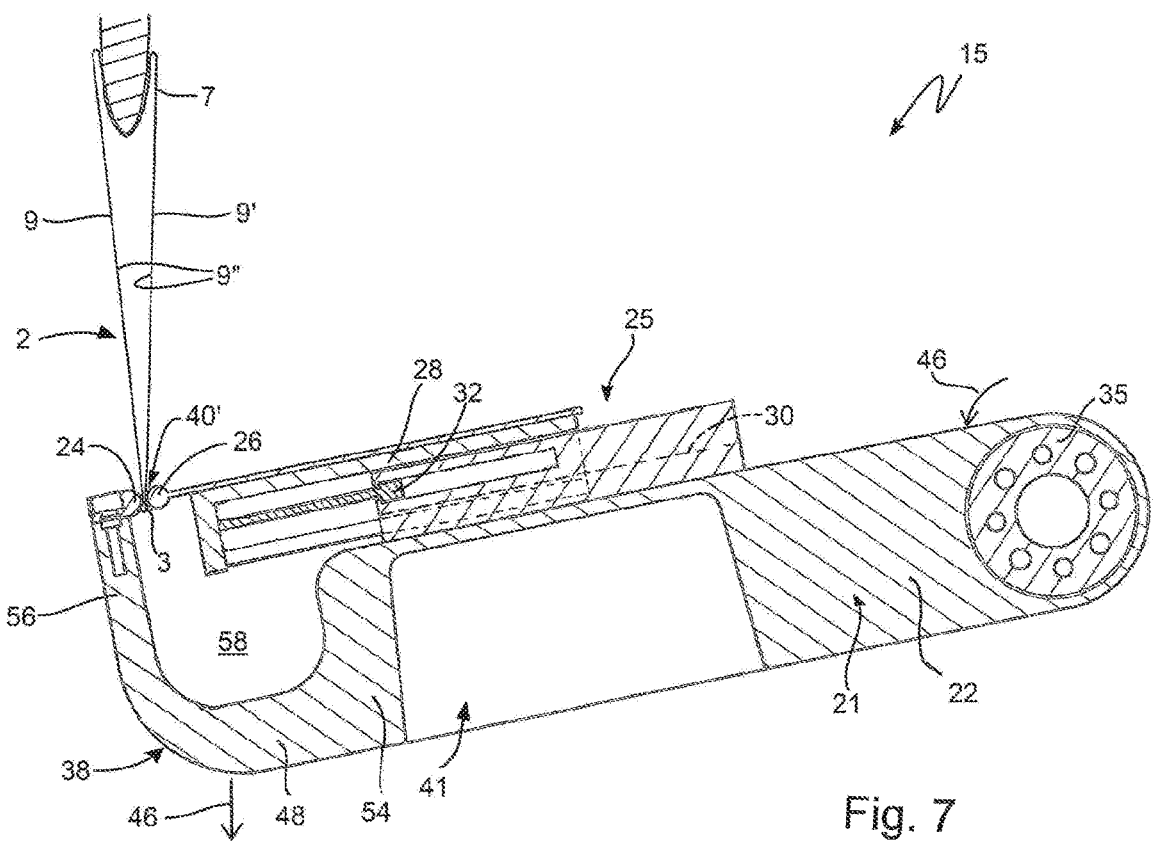
FIG. 7 shows how the gripping device is moved downwards, causing the cuff end portion to slip relatively upwardly between the gripping surfaces until a beaded cuff end at a terminal end of the cuff end portion becomes lodged between the gripping surfaces.
Figure 10:
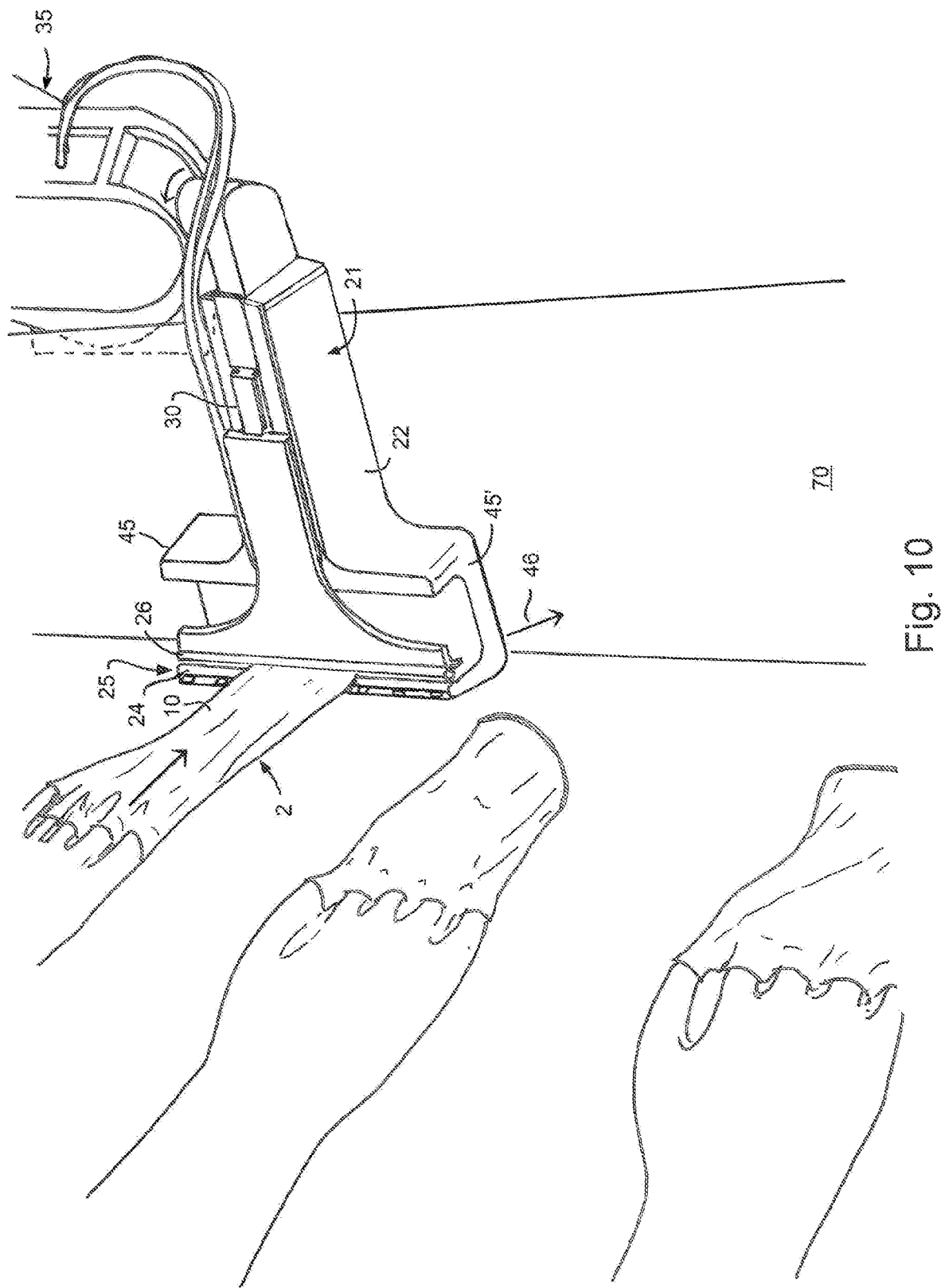
FIG. 10 is a perspective view following from FIG. 9, showing how the gripping device is moved by a stripping actuator downwards away from the former, causing the beaded cuff end to move towards the gap and engage with the gripping surfaces, following which the elastomeric glove is stretched and peeled off the dip-moulding former.

As shown in FIGS. 7 and 10, the robotic arm then moves or pivots downwardly 46 which causes the first and second gripping members 24, 26 to move downwardly together towards the beaded cuff end 3 so that the restrained cuff end portion 10 moves upwards relative to the narrowed gap 40' until the beaded cuff end is caught by the narrowed gap which is at the neck of a downwardly opening funnel.

Figure 15:
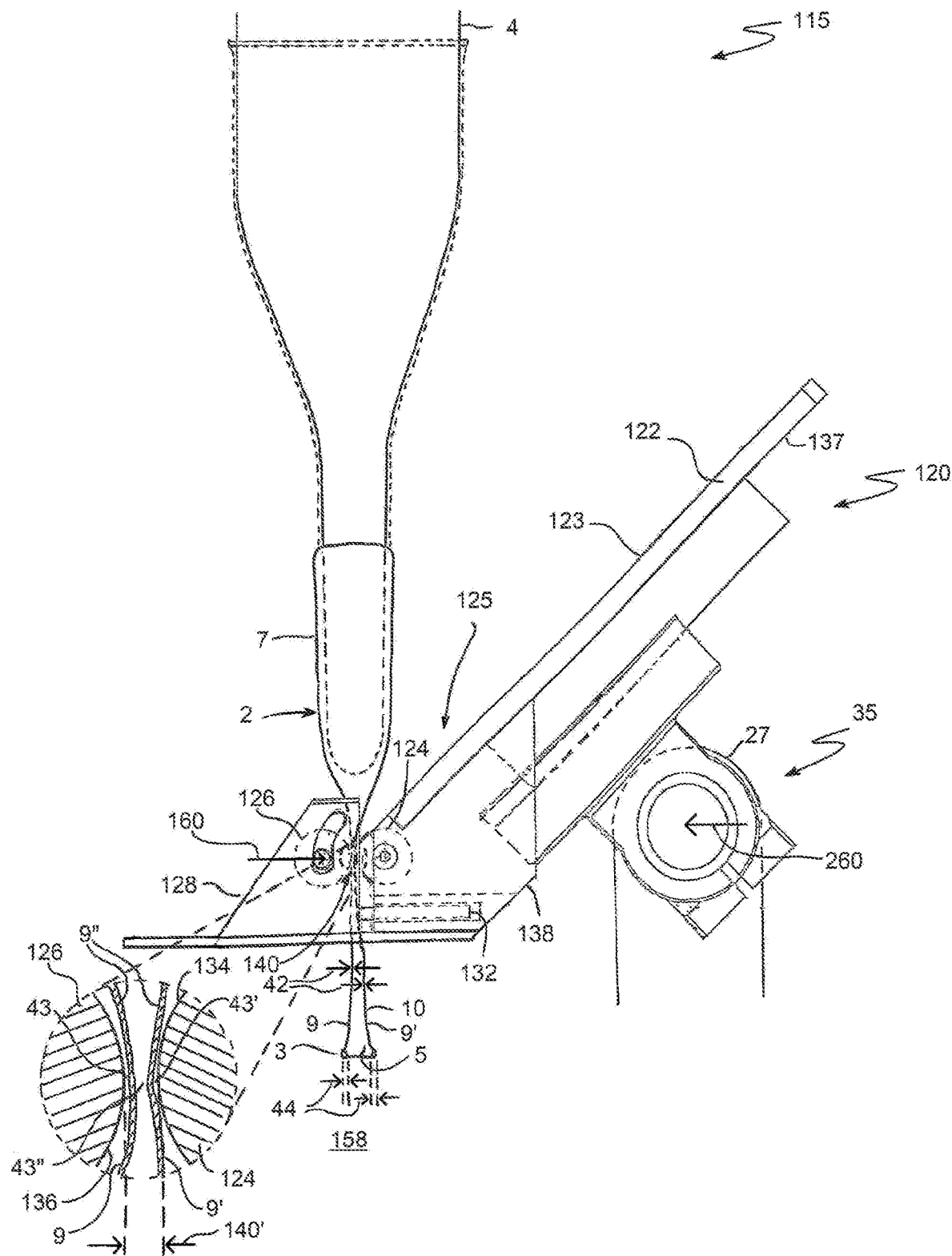
FIG. 15 is a side view showing how the rollers, once these have received the glove end portion, are moved together to hold the end portion loosely between opposed surface portions of the rollers.

In this regard, it can be seen in FIGS. 6 and 15 that the end portion 10 of the glove has a first material thickness 42 and the beaded end 3 has a second material thickness 44, the first thickness being less than the second thickness. These material thicknesses 42, 44 are essentially the sums of the thicknesses of the opposite sides of the hollow glove when these are pressed together, as would be the case when passing through or pressing against the surfaces of the constricted gap 40'. In FIGS. 6 and 15 these first and second thickness are represented, respectively, by two pairs of arrows 42, 44.

As shown in FIGS. 7, 10 and 11, the robotic arm continues to move the first and second gripping members 24, 26 downwardly 46 together with the beaded cuff end 3 caught by the narrowed gap 40' thereby pulling the cuff end portion 10 downwards until the glove is fully stripped from the former 4. The glove 2 may initially stretch before being pulled free of the former, and the reaction force against this stretching beneficially helps to seat the beaded cuff end securely in position against a lower side of the restricted gap 40'.

The robotic arm 35 then continues to move the gripping device 25 downwardly and also transversely away from the line of the dip-moulding formers 4. This rotates the orientation of the constricted gap 40' to be substantially vertical. This motion causes the glove, which is held only at the cuff-end portion where this meets the beaded cuff end, to fall towards a more horizontal orientation. The velocity of the gripping device may be accelerated by the robotic arm, with the result that the inertia of the glove, as well as air resistance, will tend to flatten the glove as the glove rotates towards horizontal. The speed of the glove as this approaches the depositing surface 70 is preferably between about 0.3 m/s and 0.6 m/s.

As the glove approaches the depositing surface the gripping actuator 32 begins to open 60' the gap 40. Air resistance, and frictional drag as the glove digit portion 7 begins to touch the depositing surface, cause the glove cuff end 10 to fall out from between the opposed gripping surfaces 34, 36, whereupon the glove 2 falls freely and is deposited substantially flat in a transverse orientation on the depositing surface 70.

Optionally, the robotic arm 35 may also move the gripping device 25 with a longitudinal component of motion to match the forwards speed 74 of the depositing surface.

As will be appreciated from the above description, the robotic arm provides a stripping actuator for fully stripping the gloves from the dip-moulding formers. The gripping actuator 32 then continues to open 60' the gap 40 while changing direction and moving upwards and laterally towards the line of formers 4 to come up from substantially underneath the next glove to be fully stripped. The cuff end portion is received inside the upwardly facing recess 55, and the cycle described above then repeats.

FIG. 13 is a side view of part of stripping apparatus 120 in the second embodiment of the invention, for fully stripping the partially stripped gloves 2 from the formers 4. In the second embodiment, the gripping device 125 has gripping members that are rollers and the gripping surfaces are gripping surfaces of the rollers. FIG. 14 is a perspective view showing how the glove, once fully stripped, falls to be supported by a supporting surface or platform 122 extending away from a first gripping member 124 and second gripping member 126 which are here a pair of opposed rollers 124, 126. In this example, the platform 122 is most closely adjacent to the first roller 124. As in the first embodiment, there is an open space or void 158 beneath the gripping members 124, 126.

The first and second rollers are cooperatively configured or arranged in parallel such that they present to each other a pair of opposed roller surfaces 134, 136. The opposed roller surfaces 134, 136 are adjacent the support platform 122.

As will be explained in more detail below, the pair of rollers is operable to roll in opposite directions in order to eject the glove from between the opposed surfaces beaded end first.

The full glove stripping station or stage 115 also includes a plurality of actuators operating under the control of a controller, which may be the same controller 50 as described above, but programmed to be operable with the second embodiment of gripping device 125, and which together provide a synchronised set of gripping and stripping actuators.

The second roller 126 is mounted on a linearly movable carriage 128 formed by a pair of opposite mounting or support brackets, each of which is slideable on a track 130. The first roller 124 is fixed to by a pair of end brackets 138 that are fixedly mounted to the same track. One of the actuators is a linear piston actuator 132, 132' that is configured to move the second roller 126 along the tracks 130 towards 160 and away 160' from the first roller 124. At its closest approach the first and second opposed surfaces 134, 136 nearly come into contact and at their closest separation, as shown in phantom outline in FIG. 13, the first and second opposed surfaces 134, 136' are separated by a gap 140 having a first width which, when horizontally oriented, is more than enough to receive the hanging glove end portion between the opposed surfaces 134, 136 when the rollers are centered beneath and moved relatively upwards towards the former 4.

The full stripping apparatus 120 includes the robotic arm 35, which is here attached to a rear or lower side 137 of the support platform 122. The robotic arm has several degrees of freedom to move linearly and rotationally, as shown by arrows in the drawings, most clearly in FIG. 13. The actuation of the robotic arm and the movement of the rollers are synchronised with the position of the moving former and the glove end portion hanging down from the former.

As shown in FIG. 15, after the glove cuff end portion has been received between the rollers 124, 126, with the cuff end portion hanging down freely into the open space 158, the piston actuator 132 moves the second roller towards the first roller to reduce the size of the gap 140' to a second width less than the first width such that the constricted gap is just wide enough for the cuff end portion to move through the gap with some clearance 43, 43' with at least one roller surface so that there is no binding against the opposed roller surfaces 134, 136, as shown in the enlarged inset view in FIG. 15. It would, however, be possible for there to be some contact between the surfaces and the glove and some resulting friction between the glove end portion and the surfaces in the constricted gap, particularly if there is some clearance 43" between glove inner surfaces 9" or if both rollers were free to rotate in response to such friction.

As in the first embodiment, both front and back sides 9, 9' of the glove are free to slip in a longitudinal direction against each other as the cuff ends come into contact with the opposed gripping surfaces of the restricted gap. The advantage of this is that both sides 9, 9' of the glove cuff end 10 can slide until the beaded cuff end 3 comes into contact with the surfaces 134, 136 of the narrowed or restricted gap 140', and this imparts a straight line alignment of the cuff beaded end on each of the opposite sides 9, 9' of the glove cuff end.

In FIG. 15 it can be seen, as explained above in relation to FIG. 6, that the end portion 10 of the glove has a first material thickness 42 and the beaded end 3 has a second material thickness 44, the first thickness being less than said second thickness. These material thicknesses 42, 44 are essentially the sums of the thicknesses of the opposite sides of the hollow glove when these are pressed together, as would be the case when passing through or pressing against a constricted gap 140'. As in FIG. 6, these first and second thicknesses are represented in FIG. 15, respectively, by two pairs of arrows 42, 44.

As in the first embodiment, the constricted gap 140' is set such that the glove end portion 10 is held loosely between the rollers but the beaded cuff end 3 has a material thickness 44 that is too great to pass readily through the narrowed gap.

So that the first roller 124 does not interfere with the cuff end 10 when the paired rollers 124, 126 are moved upwardly towards the downwardly hanging cuff end 10, the first roller is initially spaced laterally to one side of the expected position of the cuff end 10, and then moved inwardly 160 by the robotic arm at the same time the second roller is moved inwardly in the opposite direction 260, the gap 140 thereby being narrowed in extent. In this way, the gap is substantially centered with respect to the hanging end portion of the glove.

The first roller 124 and the second roller 126 are therefore moved 160, 260 relative to the glove end portion 10 until the end portion is held between the opposed portions 134, 136 of the roller surfaces.

Figure 16:
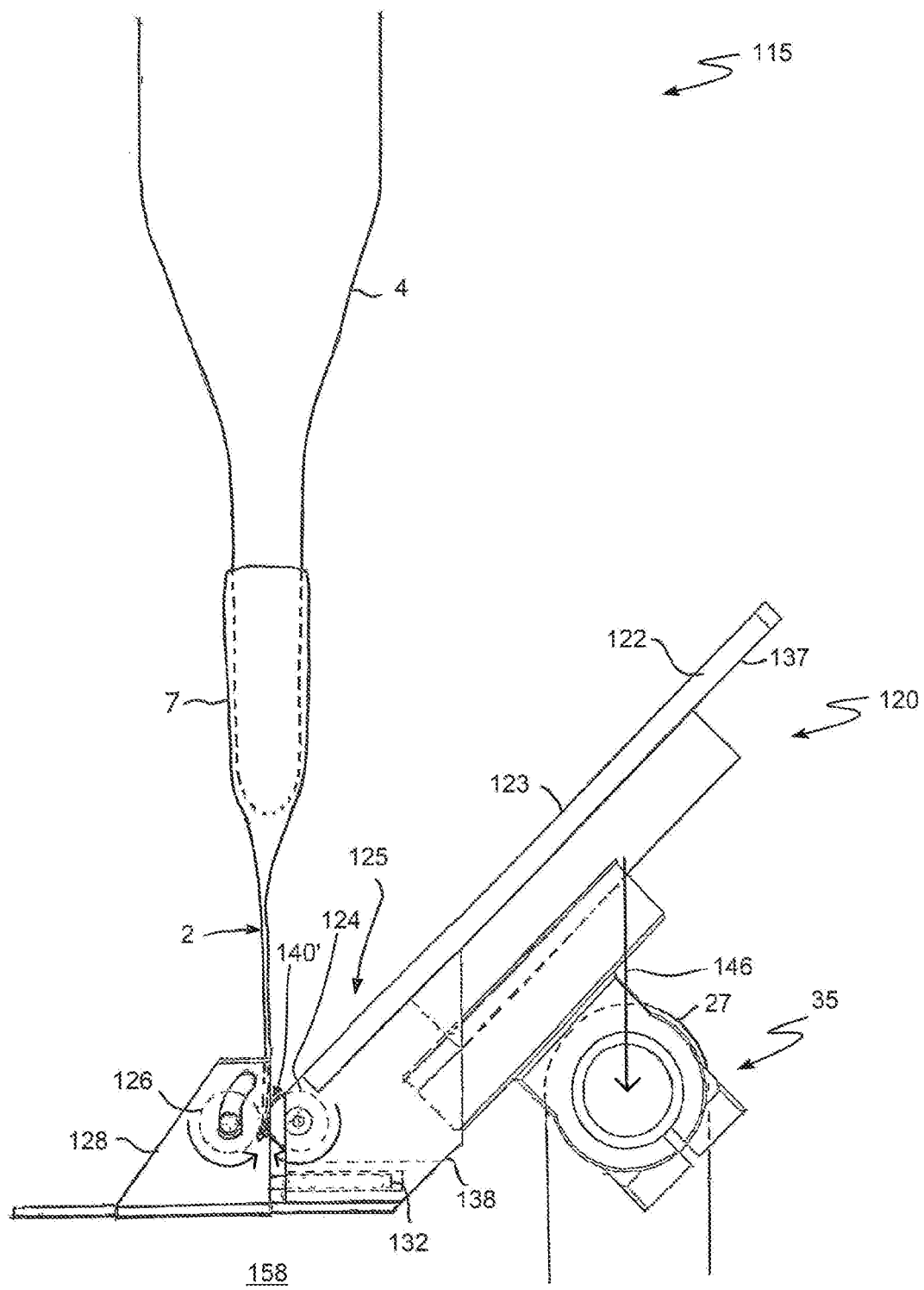
FIG. 16 is a side view following that of FIG. 15, showing how the stripping apparatus, when moved downwardly relative to the former, traps a beaded cuff end of the glove at the opposed surface portions.
Figure 17:
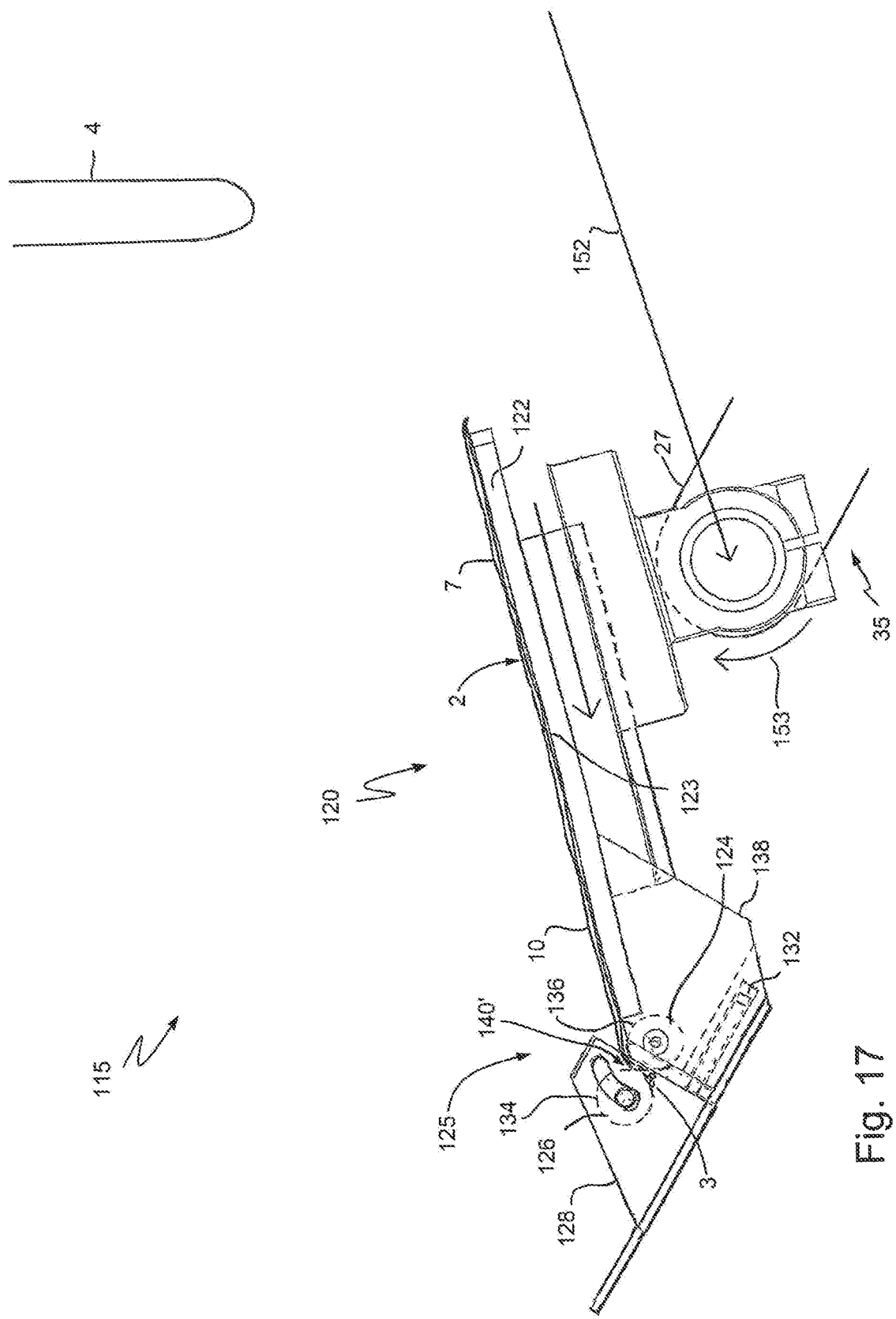
FIG. 17 is a side view following that of FIG. 16, showing how, once the glove is fully stripped from the dip-moulding former, the apparatus rotates and moves downwards and laterally away from the former and production line track, thereby causing the fully stripped glove to lie on a supporting platform that extends laterally away from a first one of the rollers.

As shown in FIG. 16, the next process step is to use the robotic arm 35 to move the first roller 124 and the second roller 126 downwardly together 146 relative to the former in order to engage or catch the beaded cuff end 3 in the constricted gap 140'. When this happens, the rest of the glove 7 starts to be peeled off the former. The first and second embodiments work in the same way insofar as the force needed to effect stripping of the glove 2 is less than the force that would be required to squeeze the beaded cuff end 3 through the constricted gap 40' 140'.

To help ensure that the beaded cuff end 3 does not squeeze through the narrowed gap, the piston 132 may, optionally, be actuated to close the gap further in order to securely hold the cuff end portion once the downward movement 146 has progressed to the point where the beaded end 3 of even the lowest hanging cuff end portion would have become caught by the gap. Optionally, the first embodiment may also employ this technique.

As in the first embodiment, the opposed gripping surfaces 134, 136 present a downwardly opening funnel into which the beaded cuff end 3 is trapped.

As the paired rollers are moved further downwards, the cuff end 10 and then the glove finger portion 7 will be pulled fully from the former 4, and as this happens, the robotic arm 35 moves the supporting platform 122 and paired rollers 124, 126 in a lateral direction 152 relative to roller axes 154, 156 and at the same time rotates 153 the supporting platform 122 towards a more level orientation. The rollers 124, 126 are mounted on the same supporting structure 130, 138 as the platform and are therefore moved in concert with the platform. The gap between rollers 124, 126 therefore rotates at the same time away from a level orientation. Therefore, the support platform rotates closer to a level orientation so that the glove can lie against the platform in a substantially flat orientation, at the same time as the gap between the rollers moves towards a more upright orientation in order to eject the elastomeric glove in a substantially lateral direction, rather than in a downwardly direction. This helps the glove to lie flat after ejection.

In this example the platform 122 has a supporting surface 123 that is planar, with the plane of the supporting surface being tangential to the roller surface 134 of the first roller 124, so that the elastomeric glove travels in a substantially straight line towards the first roller surface during ejection, and preferably also substantially in line with the constricted gap 140' so that the elastomeric glove travels in a substantially straight line towards the gap during ejection.

It should be noted that the platform is initially substantially upright, at no more than 45° from vertical. This arrangement permits the support platform to fit in the space between the paired lines of formers. Also, when the support platform moves laterally towards nearly horizontal, air pressure exerted on the falling glove by the rotation 153 and linear movement 152 of the of the platform helps to stretch out the glove digit portion 7 and land this substantially flat on the support platform. This is a particular benefit, in helping to prevent creases from forming in the glove.

Figure 18:
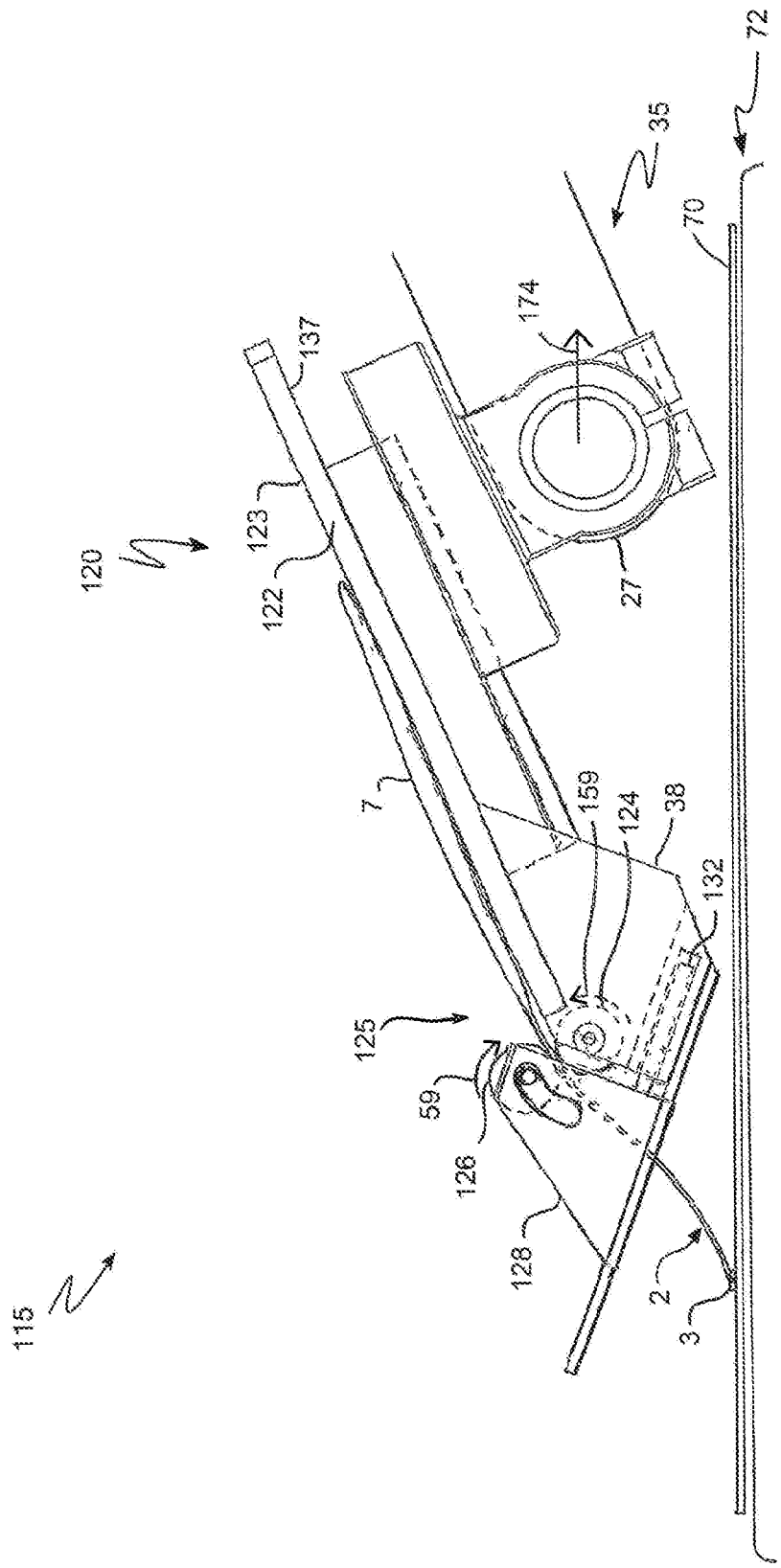
FIG. 18 is a side view following that of FIG. 17, showing how the glove is ejected by the opposed rolling surfaces onto a receiving surface.

Optionally, the second roller may be configured to rotate about the first roller, when the gap is narrowed to hold the glove end portion in the gap. This is shown in FIG. 18, where it can be see that the second roller 126 has moved to be relatively above the first roller 124. This movement is effected by an actuator which may also comprise a motor for driving the rotation of the second roller when the glove is later ejected. This actuator and motor is shown schematically in FIG. 14 by the dashed outlines 68 on the outer sides of the support brackets 128. For clarity this actuator and motor is not shown in the other FIGS. 13 and 15 to 19.

The first roller 124 has a fixed rotation axis 154 but may be provided with a motor for driving the rotation of the first roller when the glove is later ejected. This actuator and motor is shown schematically in FIG. 14 by the dashed outline 168 on the outer side of one of the support brackets 138. For clarity this motor is not shown in the other FIGS. 13 and 15 to 19.

Figure 19:
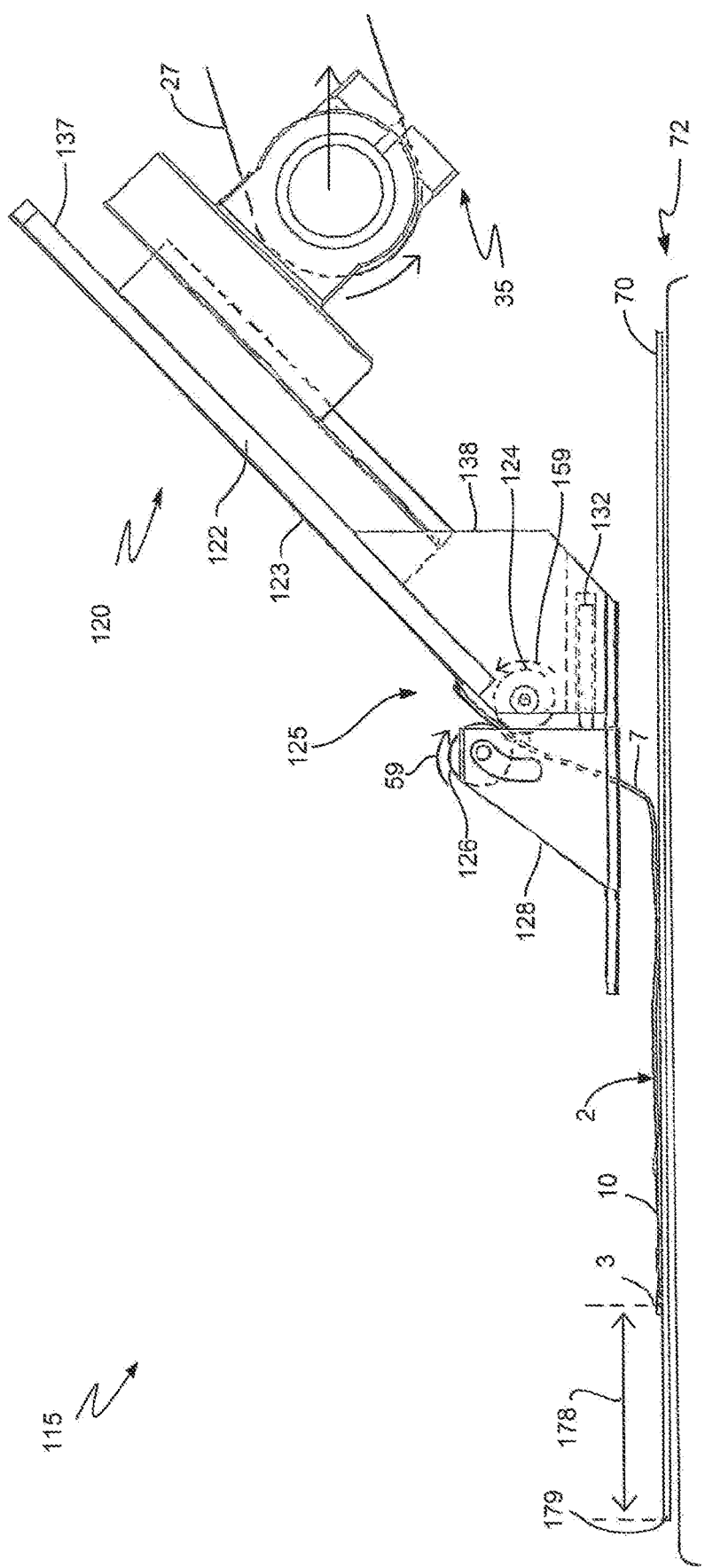
FIG. 19 is a side view following that of FIG. 18, when the glove is nearly fully ejected onto a moving conveyor.

As shown in FIGS. 18 and 19, it is preferred if both the first and second rollers 124, 126 are rotationally driven 59, 159 by the motors 68, 168 when the glove is being ejected. At a minimum, one of the rollers 124, 126 will have such a motor. Although not illustrated, instead of two motors, it would be possible to use one motor and a belt or gear mechanism connecting the two rollers together. If one of the rollers is not driven by a motor, but freely rotating instead, then it will be rotated by frictional contact with the glove as this is pulled through the opposed portions during ejection.

The advantage of moving the second roller to be above the first roller is that the line of travel of the glove resting on the supporting platform is kept substantially straight until the glove exits the gap between the rollers. A similar effect could be achieved by fixing the axes 154, 156 of both rollers with respect to each other, and having the support platform rotatable with respect to the pair of rollers.

FIGS. 18 and 19 show how the glove is ejected by the opposed rolling surfaces onto the receiving surface 70. The robotic arm is moved laterally backwards 174 at no more than the same speed as the ejected glove lies down upon the receiving surface 70 so that the cuff beaded end 3 does not drag on the receiving surface. In practice, to ensure no dragging on the receiving surface, the lateral backwards speed may be somewhat less, as the glove digit portions will tend to roll and fall flat once completely ejected.

The receiving surface 70 is preferably that of the belt conveyor 72 described above in relation to the first embodiment, in which case, during ejection of the elastomeric glove, the robotic arm is advanced in the same direction and speed as the conveying surface. The robotic arm then deposits each glove separately on the conveying surfaces, separated by a distance over which the conveying surfaces advances between each cycle of the apparatus.

Alternatively, the gloves may be stacked one on another at the same location on the receiving surface 70 to form a stack of gloves. In this case the robotic arm is arranged to eject each subsequent glove from an increased height above the depositing surface so that the lowermost parts of the stripping apparatus do not interfere with the growing stack. Once the stack contains a desired number of the gloves, the stack is removed, either manually or automatically. In the latter case, the receiving surface may be a conveying surface which moves only when each stack has been completed.

As shown in FIG. 19, the robotic arm 35 rotates the support platform 122 back towards upright and moves the paired rollers closer to the receiving surface as the glove is being ejected, which helps the glove digit portion 7 to lie flat on the receiving surface 70.

After the glove has been fully ejected, the moving parts of the glove stripping apparatus 120 return to their original configuration, and the process is then repeated with the next glove 2 to be stripped from the next former 4.

One optional effect that can be used to improve the flatness of the ejected gloves is shown in FIG. 18, where some air trapped in the hollow interior of the grove is being compressed, thereby causing the glove digit portion 7 to puff up. This can help flatten out creases to straighten glove digits if these do not lie separate from each other. To prevent the compressed air from bursting the glove digit portion, the second roller is provided with circumferential grooves 176 that permit air to escape at a controlled rate.

In practice, a cycle time of about 2 s to 3 s can be achieved with this apparatus. The typical production speed is up to a maximum of two gloves per second per row. Therefore, approximately four to six of the above full stripping apparatus would, in practice, be used per line 6, 6', and could be ganged together to employ a single robotic arm.

The robotic arm, together with the actuators and motors described above, operating under the control of a controller 50 together form a synchronised set of actuators configured to perform, in sequence, the process steps described above.

Once on the conveyor surface 70, the series of deposited gloves 2 then feeds an automatic glove packing station, for example of the type described in patent document WO 2011/048414 A1.

In the embodiment described above, the conveyor surfaces on which gloves are deposited moves in the same direction as the dip-moulding formers 4. An advantage of this arrangement is that the depositing apparatus does not need to change direction between tracking the moving formers and tracking the moving conveyor surface when depositing the glove.

It would, however, alternatively be possible to reverse the direction of the conveying surface, so that this was parallel but opposite to the direction of motion of the dip-moulding formers 4. The advantage of this arrangement is that the total travel taken by the carriage in the longitudinal direction (i.e. the direction of motion of the formers) is reduced. Also, because the robotic arm 35 can start moving longitudinally back when tracking the conveyor, the robotic arm 35 will be closer to its initial position after depositing of the glove on the conveyor surface. This can provide an important benefit in reducing the achievable cycle time of the apparatus.

A particular benefit of the invention is that deposited gloves on the receiving surface 70 are kept flatter. In both embodiments, the gloves are dropped or ejected in a substantially horizontal orientation in close proximity with the receiving surface, so that the gloves do not have time to bend or fold in an unwanted way prior to coming to rest on the receiving surface, or on a previously deposited glove, if a stack is being formed.

Another significant benefit of the invention is that the initial registration of the cuff beaded end 3 with the opposed gripping surfaces 34, 36, 134, 136 helps to ensure that the cuff end is then deposited in a known and predicable manner, for example with an edge 78, 178 from an edge 79, 179 of the receiving surface 70, that is highly consistent and repeatable from glove to glove, as shown in FIGS. 12 and 19.

These factors help to make further processing of the gloves more consistent and help to optimise the way gloves lie one on another when formed into a stack. This in turn helps to increase the number of gloves that can be packed into a glove dispenser of a given volume.

Although the invention has been described with particular reference to the production of disposable hygienic inspection gloves, the principles of the invention can be applied a wide range of different types of flexible gloves, for example cleaning gloves.

The invention described above, in its various embodiments, therefore provides a convenient apparatus and method for stripping and subsequent handling of a variety of types of flexible glove produced in a dip-moulding process when such gloves are to be stripped off a former and then moved for further processing, for example being deposited on a conveyor, in a stack or in a box.

It is to be recognized that various alterations, modifications, and/or additions may be introduced into the constructions and arrangements of parts described above without departing from the spirit or scope of the present invention, as defined by the allowed claims and their legal equivalents.

The invention claimed is:

1. A method for fully stripping gloves from dip-moulding formers using a glove stripping apparatus, the method comprising the steps of:
    providing a glove stripping apparatus comprising, in relevant part, a gripping device relatively movable with respect to a downwardly hanging cuff end portion of a partially stripped glove, the gripping device comprising at least two gripping members including a first gripping member and a second gripping member, said gripping members having respective opposed first and second gripping surfaces and being movable relative to each other;
    providing said gloves partially stripped from a dip-moulding former, said partially stripped gloves each having a cuff end portion terminated with a beaded cuff end hanging downwardly from said dip-moulding former, the beaded cuff end being of a thicker material than a thickness of material of the cuff end portion;
    positioning the first gripping member and the second gripping member to provide a gap between said opposed gripping surfaces where said gripping surfaces are moved closest to one another;
    locating the first gripping member and the second gripping member beneath the dip-moulding former and receiving in said gap between said opposed gripping surfaces said downwardly hanging cuff end portion;
    moving at least one of the first gripping member and the second gripping member relative to said cuff end portion received in said gap between said opposed gripping surfaces to reduce said gap and provided a narrowed gap, until said cuff end portion is positioned between said opposed gripping surfaces with said beaded cuff end being below said narrowed gap;
    moving the first gripping member and the second gripping member downwardly together towards said beaded cuff end so that said cuff end portion between said opposed gripping surfaces moves upwards relative to said narrowed gap until said beaded cuff end approaches said narrowed gap, said narrowed gap being insufficiently wide to allow passage of the beaded cuff end through said narrowed gap; and
    continuing to move the first gripping member and the second gripping member downwardly together with said beaded cuff end prevented from passing through said narrowed gap, thereby pulling said cuff end portion downwards until said glove is fully stripped from said dip-moulding former.

2. The method as claimed in claim 1, in which the method comprises the step of moving one gripping member towards said cuff end portion and the other gripping member as said gap is narrowed.

3. The method as claimed in claim 1, in which the method comprises after the glove has been fully stripped the steps of:
    orienting the stripped glove towards a substantially horizontal orientation for subsequent deposition on a substantially horizontal surface; and
    moving the first gripping member and the second gripping member relative to each other to free the cuff end portion.

4. The method as claimed in claim 1, in which after the glove has been fully stripped the method comprises:
    using the gripping members to hold the glove only at the cuff end portion nearest the beaded cuff end and at the same time to accelerate the glove in a substantially downwards direction and then in a substantially horizontal direction so that the glove is flattened by its own inertia and/or by aerodynamic drag prior to release in a substantially horizontal orientation on a depositing surface.

5. The method as claimed in claim 1, in which one or both of said opposed gripping surfaces is a ridge-like projection towards said gap and the method comprises moving said opposed gripping surfaces relatively towards one another until the gap is sufficiently narrow so as to prevent passage of the material of the beaded cuff end and also sufficiently wide such that material of the cuff end portion can slide freely between said opposed gripping surfaces as the first gripping member and the second gripping member are moved downwardly together towards said beaded cuff end.

6. The method as claimed in claim 1, in which at least one of said opposed gripping surfaces is a rolling surface of a roller, and the method comprises:
  moving said opposed gripping surfaces relatively towards one another until the gap is sufficiently narrow so as to prevent passage of the material of the beaded cuff end and also sufficiently narrow such that material of the cuff end portion can be held between said opposed gripping surfaces; and
  moving the rolling surface to facilitate the downward movement of the first gripping member and the second gripping member towards said beaded cuff end.

7. The method as claimed in claim 1, in the method comprises depositing stripped gloves on a conveyor surface, a series of said deposited gloves then feeding an automatic glove packing station.

8. The method as claimed in claim 1, wherein following full stripping of said glove, the method comprises moving said stripped gloves for further processing, by being deposited on a conveyor, in one of a stack or a box.

9. A method for fully stripping gloves from dip-moulding formers using a glove stripping apparatus, the method comprising the steps of:
  providing a glove stripping apparatus comprising, in part, a gripping device relatively movable with respect to a downwardly hanging cuff end portion of a partially stripped glove, the gripping device comprising at least two gripping members including a first gripping member and a second gripping member, said gripping members having respective opposed first and second gripping surfaces and being movable relative to each other;
  providing said gloves partially stripped from a dip-moulding former, said partially stripped gloves each having a cuff end portion terminated with a beaded cuff end hanging downwardly from said dip-moulding former, the beaded cuff end being of a thicker material than a thickness of material of the cuff end portion;
  relatively moving apart said gripping surfaces to increase the width of a gap between said surfaces and positioning said moved apart surfaces beneath the former and on opposite sides of said downwardly hanging cuff end portion with said beaded cuff end of said glove hanging in an open space below said gripping surfaces;
  relatively moving together said gripping surfaces to position said cuff end portion between said gripping surfaces, said gap being sufficiently narrow to block upwards passage of the beaded cuff end through said gap while being sufficiently wide to allow upwards passage of cuff end portion;
  relatively moving said gripping surfaces away from the former in order to catch said beaded cuff end between said surfaces as the cuff end portion moves relatively upwardly through said gap; and
  with said beaded cuff end caught by said gap, continuing to relatively move said gripping surfaces away from the former in order to fully strip said glove from said former.

10. The method as claimed in claim 9, in which said gripping surfaces move downwardly away from the former as said beaded cuff end is caught between said gripping surfaces and as said glove is fully stripped from said dip-moulding former.

11. The method as claimed in claim 9, wherein the method comprises depositing stripped gloves on a conveyor surface, a series of said deposited gloves then feeding an automatic glove packing station.

12. The method as claimed in claim 9, wherein following full stripping of said glove, the method comprises moving said stripped gloves for further processing, by being deposited on a conveyor, in one of a stack or a box.

13. A method for fully stripping gloves from dip-moulding formers using a glove stripping apparatus, the method comprising the steps of:
  providing a glove stripping apparatus comprising, in relevant part, a gripping device relatively movable with respect to a downwardly hanging cuff end portion of a partially stripped glove, the gripping device comprising at least two gripping members including a first gripping member and a second gripping member, said gripping members having respective opposed first and second gripping surfaces and being movable relative to each other;
  providing said gloves partially stripped from a dip-moulding former, said partially stripped gloves each having a cuff end portion terminated with a beaded cuff end hanging downwardly from said dip-moulding former, the beaded cuff end being of a thicker material than a thickness of material of the cuff end portion;
  positioning the first gripping member and the second gripping member to provide a gap between said opposed gripping surfaces where said gripping surfaces are moved closest to one another;
  locating the first gripping member and the second gripping member beneath the dip-moulding former and receiving in said gap between said opposed gripping surfaces said downwardly hanging cuff end portion;
  moving at least one of the first gripping member and the second gripping member relative to said cuff end portion received in said gap between said opposed gripping surfaces to reduce said gap and provided a narrowed gap, until said cuff end portion is positioned between said opposed gripping surfaces with said beaded cuff end being below said narrowed gap;
  moving the first gripping member and the second gripping member downwardly together towards said beaded cuff end so that said cuff end portion between said opposed gripping surfaces moves upwards relative to said narrowed gap until said beaded cuff end approaches said narrowed gap, said narrowed gap being insufficiently wide to allow passage of the beaded cuff end through said narrowed gap;
  continuing to move the first gripping member and the second gripping member downwardly together with said beaded cuff end prevented from passing through said narrowed gap, thereby pulling said cuff end portion downwards until said glove is fully stripped from said dip-moulding former; and after the glove has been fully stripped from said dip-moulding former, further comprising using the gripping members to hold the glove only at the cuff end portion nearest the beaded cuff end and at the same time to accelerate the glove in a substantially downwards direction and then in a substantially horizontal direction so that the glove is flattened by its own inertia and/or by aerodynamic drag prior to release in a substantially horizontal orientation on a depositing surface.

* * * * *